United States Patent [19]

Mihm et al.

[11] Patent Number: 5,692,768
[45] Date of Patent: Dec. 2, 1997

[54] AIRBAG ASSEMBLY

[75] Inventors: Joseph J. Mihm, North Branch; Tracy S. Sparks, Lapeer, both of Mich.; John F. Rhein, Hamburg, N.Y.; Jeffrey C. Synor, Utica, Mich.; Craig M. Fischer, Mesa, Ariz.; Kurt F. Fischer, Oxford, Mich.

[73] Assignee: TRW Vehicle Safety Systems Inc., Lyndhurst, Ohio

[21] Appl. No.: 64,039

[22] PCT Filed: Oct. 21, 1992

[86] PCT No.: PCT/US92/08802

§ 371 Date: Mar. 1, 1995

§ 102(e) Date: Mar. 1, 1995

[87] PCT Pub. No.: WO93/08042

PCT Pub. Date: Apr. 29, 1993

Related U.S. Application Data

[63] Continuation-in-part of Ser. No. 780,260, Oct. 21, 1991, abandoned.

[51] Int. Cl.$^6$ .................................................. B60R 21/20
[52] U.S. Cl. .................................................. 280/728.2
[58] Field of Search ........................... 280/728 A, 743, 280/728 B, 730, 731, 732, 736, 728.1, 728.2; 403/336, 335; 220/424, 672, 319, 320, 692, 693

[56] References Cited

U.S. PATENT DOCUMENTS

| | | |
|---|---|---|
| 3,493,142 | 2/1970 | Assmann . |
| 3,618,980 | 11/1971 | Leising . |
| 3,708,181 | 1/1973 | Mazelsky . |
| 3,788,665 | 1/1974 | Noll et al. . |
| 3,791,671 | 2/1974 | Zens . |
| 3,794,346 | 2/1974 | Brockman et al. . |
| 3,794,347 | 2/1974 | Zens . |
| 3,853,334 | 12/1974 | Auman et al. . |
| 3,877,719 | 4/1975 | Lewis et al. . |
| 3,895,823 | 7/1975 | Stephenson . |
| 3,900,210 | 8/1975 | Lohr ........................ 280/729 |
| 3,910,596 | 10/1975 | Wulbrecht et al. ............ 280/737 |
| 4,111,457 | 9/1978 | Kob et al. . |
| 4,137,847 | 2/1979 | Osborne . |
| 4,153,273 | 5/1979 | Risko . |
| 4,158,696 | 6/1979 | Wilhelm . |
| 4,191,392 | 3/1980 | Barnett . |
| 4,223,911 | 9/1980 | Cymbal et al. . |
| 4,278,638 | 7/1981 | Nilsson et al. . |
| 4,394,033 | 7/1983 | Goetz et al. . |
| 4,400,010 | 8/1983 | Stütz et al. . |
| 4,770,429 | 9/1988 | Maier et al. . |
| 4,810,005 | 3/1989 | Föhl . |
| 4,842,300 | 6/1989 | Ziomek et al. . |
| 4,902,036 | 2/1990 | Zander et al. . |
| 4,911,471 | 3/1990 | Hirabayshi . |

(List continued on next page.)

FOREIGN PATENT DOCUMENTS

| | | |
|---|---|---|
| 2-5370 | 1/1990 | Japan . |
| 2-155855 | 6/1990 | Japan . |
| 2-303952 | 12/1990 | Japan . |
| 2-303953 | 12/1990 | Japan . |

OTHER PUBLICATIONS

Takata Corp. airbag module (photograph attached as Exhibit A).

*Primary Examiner*—Karin L. Tyson
*Attorney, Agent, or Firm*—Tarolli, Sundheim, Covell, Tummino & Szabo

[57] ABSTRACT

An airbag assembly (10) includes a reaction device (15), an inflator (20), and an airbag (25). The reaction device (15) includes a first housing member (27) and a second housing member (28). In the completed airbag assembly, the housing members (27) and (28) form a receptacle with a cavity (29) and a deployment opening (30). The housing members (27) and (28) are configured to capture and orient the inflator (20) and/or the airbag (25) in the cavity (29) of the reaction device (15) as the housing members are being coupled together.

32 Claims, 22 Drawing Sheets

U.S. PATENT DOCUMENTS

| | | | |
|---|---|---|---|
| 4,913,461 | 4/1990 | Cuevas | 280/731 |
| 4,915,410 | 4/1990 | Bachelder . | |
| 4,928,991 | 5/1990 | Thorn . | |
| 4,938,501 | 7/1990 | Wipasuramonton . | |
| 4,941,678 | 7/1990 | Lauritzen et al. . | |
| 4,944,527 | 7/1990 | Bishop et al. . | |
| 4,964,654 | 10/1990 | Bishop et al. . | |
| 4,989,897 | 2/1991 | Takada . | |
| 5,062,664 | 11/1991 | Bishop et al. | 280/741 |
| 5,069,480 | 12/1991 | Good . | |
| 5,096,222 | 3/1992 | Komersko et al. . | |
| 5,129,674 | 7/1992 | Levosinski . | |
| 5,131,680 | 7/1992 | Coultas . | |

AIRBAG ASSEMBLY

RELATED APPLICATIONS

This application is a continuation-in-part application of U.S. application Ser. No. 07/780,260 filed Oct. 21, 1991, and now abandoned, entitled "Air Bag Reaction Can Structure and Method of Assembly." The entire disclosure of this earlier application is hereby incorporated by reference.

FIELD OF THE INVENTION

The present invention relates to an airbag assembly, in which an inflator and/or an airbag is coupled with a reaction device as the reaction device is being formed.

BACKGROUND AND SUMMARY OF THE INVENTION

An airbag assembly is commonly installed in a vehicle to protect an occupant in the event of a crash or collision. A typical airbag assembly comprises a reaction device, an airbag coupled to the reaction device, and an inflator also coupled to the reaction device. The airbag assembly is generally installed in a vehicle by attaching the reaction device to a structural part of the vehicle.

In the past, various methods have been developed for assembling an airbag assembly. For example, to assemble the airbag assembly shown in U.S. Pat. No. 4,915,410 to Bachelder, an airbag and a cover are secured to a reaction plate. Thereafter, an inflator is attached to the reaction plate to complete the airbag assembly. The attachment of the inflator particularly includes placing the inflator in a cradle formed in the reaction plate and securing the inflator in the cradle.

Additionally, to assemble the airbag assembly disclosed in U.S. patent application Ser. No. 07/684,664 filed Apr. 12, 1991, for "Air Bag Inflator and Method of Assembly" (assigned to the assignee of the present invention), an airbag is located within, and secured to, a reaction can. Thereafter, a portion of an inflator is inserted into a slot in the reaction can and the remaining portion of the inflator is secured to an outside surface of the reaction can.

Further, to assemble the airbag assembly disclosed in U.S. Pat. No. 4,153,273 to Risko, an airbag is initially arranged within the cavity of a reaction can. The inflator is then inserted into the cavity and coupled to the reaction can. The arrangement of the airbag within the Risko reaction can is such that the inflator traps a portion of the airbag to secure the airbag to the reaction can.

Still further, to assemble the airbag assembly disclosed in U.S. Pat. No. 4,842,300 to Ziomek, et al., an airbag is inserted into a reaction can and then coupled to the reaction can. The inflator is then inserted through a side opening in the reaction can and coupled to the reaction can.

In the foregoing airbag assemblies, the reaction device (i.e., the reaction plate or the reaction can) is initially formed as a complete unit and the inflator and the airbag are then coupled to the completed reaction device. In contrast, the present invention provides an airbag assembly in which the inflator and/or the airbag is coupled with the reaction device as the reaction device is being formed.

More particularly, the present invention provides an apparatus for use in forming a vehicle airbag assembly which includes an inflator and an airbag. The apparatus comprises a plurality of housing members adapted to be coupled together to form a reaction device defining an internal cavity. The housing members are configured to capture the inflator and/or the airbag in the cavity and to retain the inflator and/or the airbag in a predetermined orientation in the cavity as the housing members are coupled together.

In certain airbag assemblies according to the present invention, first and second housing members are configured to capture both a cylindrical inflator and an airbag in the cavity and to retain both the airbag and the inflator in respective predetermined orientations in the cavity as the housing members are coupled together. The inflator includes a plurality of nozzles arranged to ensure that inflation fluid is uniformly directed into the airbag. The airbag includes a folded inflatable bag and a retainer attached to a portion of the bag. The first and second housing members are essentially identical and each defines a cradle for receiving a portion of the inflator and a channel for receiving a selected part of the airbag retainer.

In one of these airbag assemblies, the inflator-receiving cradles include springs formed in one piece with the housing members. These springs are located so as to engage the exterior of the inflator and to press the inflator resiliently against the other housing members as the housing members are coupled together. This feature enables inflators of different dimensions to be supported by a single set of housing members designed to form a single size reaction device.

In another of these airbag assemblies, the housing members are configured to form a venturi channel extending between the inflator and the airbag when the housing members are coupled together. The housing members are also shaped so that the reaction device defines an elliptical deployment opening. This airbag assembly further includes a cover and a band, and the housing members are configured so that the band may be tensioned around the cover to couple the cover to the reaction device.

In another airbag assembly according to the present invention, the first and second housing members are configured to capture both a cylindrical inflator and an airbag in the cavity and to retain both the airbag and the inflator in respective predetermined orientations in the cavity as the housing members are coupled together. The inflator includes a plurality of nozzles arranged in a 360° pattern. A diffuser is provided to direct the inflation fluid uniformly towards the airbag. The diffuser is incorporated into the airbag by having the housing members configured to capture the diffuser and to retain the diffuser in a predetermined orientation in the cavity as the housing members are coupled together. The airbag additionally includes a folded inflatable bag and a retainer attached to a portion of the bag. The first and second housing members are essentially identical and each defines a cradle for receiving a portion of the inflator and a channel for receiving a selected part of the airbag retainer.

In another airbag assembly according to the present invention, first and second housing members are configured to capture both a toroidal inflator and an airbag in the cavity and to retain both the airbag and the inflator in respective predetermined orientations in the cavity as the housing members are coupled together. The airbag includes a folded inflatable bag and a retainer attached to a portion of the bag. The first and second housing members are essentially identical and each defines a cradle for receiving a portion of the inflator and a channel for receiving a selected part of the airbag retainer. In modified versions of this assembly, the first and second housing members are configured to capture one or more toroidal inflators and an airbag in the cavity and to retain both the airbag and the inflators in respective predetermined orientations in the cavity as the housing members are coupled together.

In another airbag assembly according to the present invention, first and second housing members are configured to capture an airbag in the cavity and to retain the airbag in a predetermined orientation in the cavity as the housing members are coupled together. The airbag includes a folded inflatable bag and a retainer attached to a portion of the bag. The first and second housing members are essentially identical and each defines a channel for receiving a selected part of the airbag retainer. At least one of the housing members is configured to accommodate the external mounting of a toroidal inflator.

In yet another airbag assembly according to the present invention, first and second housing members are configured to capture a cylindrical inflator in the cavity and to retain the inflator in a predetermined orientation in the cavity as the housing members are coupled together. The inflator includes a plurality of nozzles arranged in a 360° pattern. A diffuser is provided to direct the inflation fluid uniformly towards the airbag. Specifically, the diffuser is incorporated into one of the housing members. An airbag and a cover can be subsequently coupled to the reaction device to complete the airbag assembly.

Further features of the present invention will become apparent from the following detailed description and the accompanying drawings.

DETAILED DESCRIPTION

Figure 1:
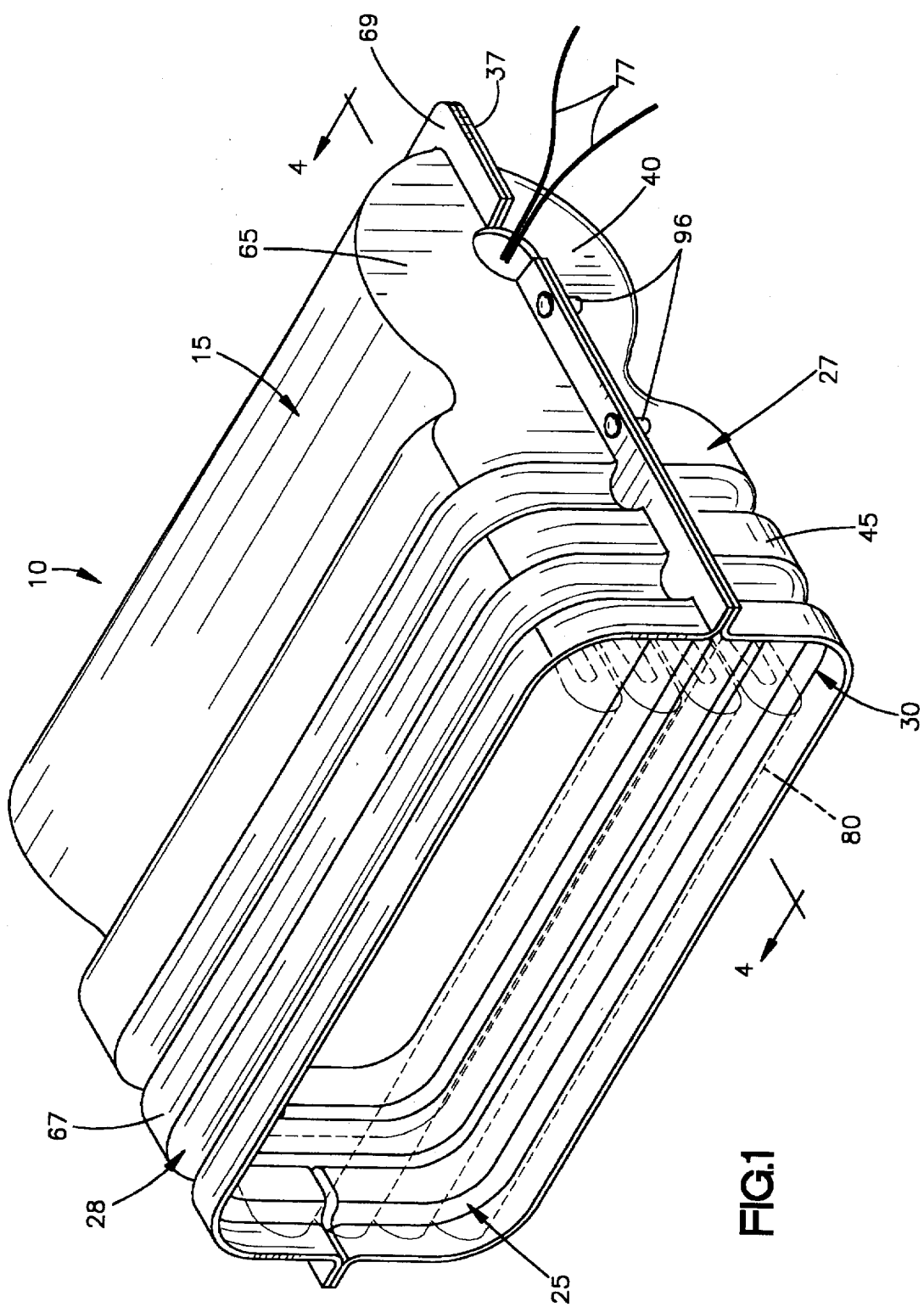
FIG. 1 is a perspective view of an airbag assembly 10 according to the present invention.
Figure 2:
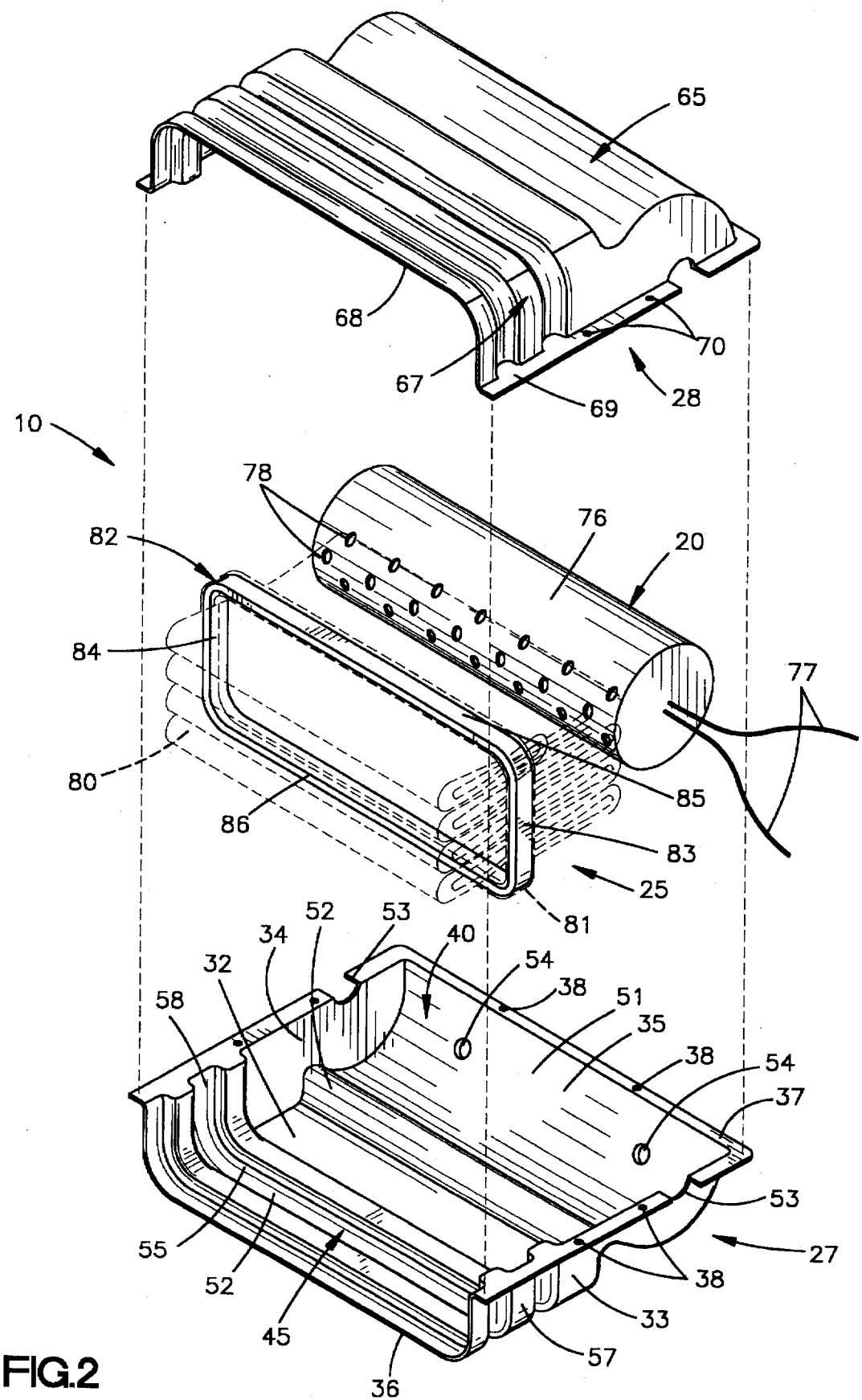
FIG. 2 is an exploded pre-assembly perspective view of the airbag assembly 10.
Figure 3:
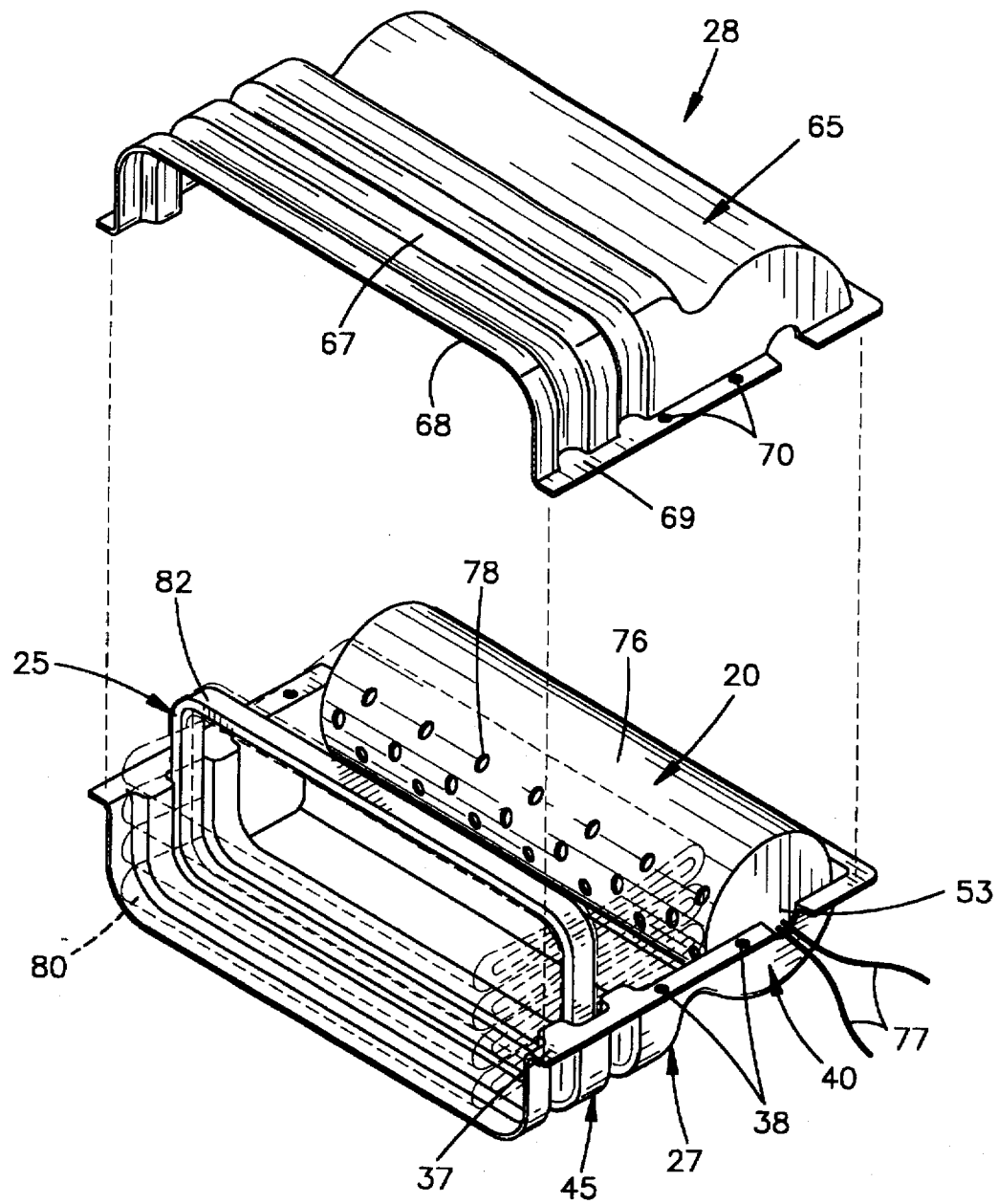
FIG. 3 is a perspective partially assembled view of the airbag assembly 10.
Figure 4:
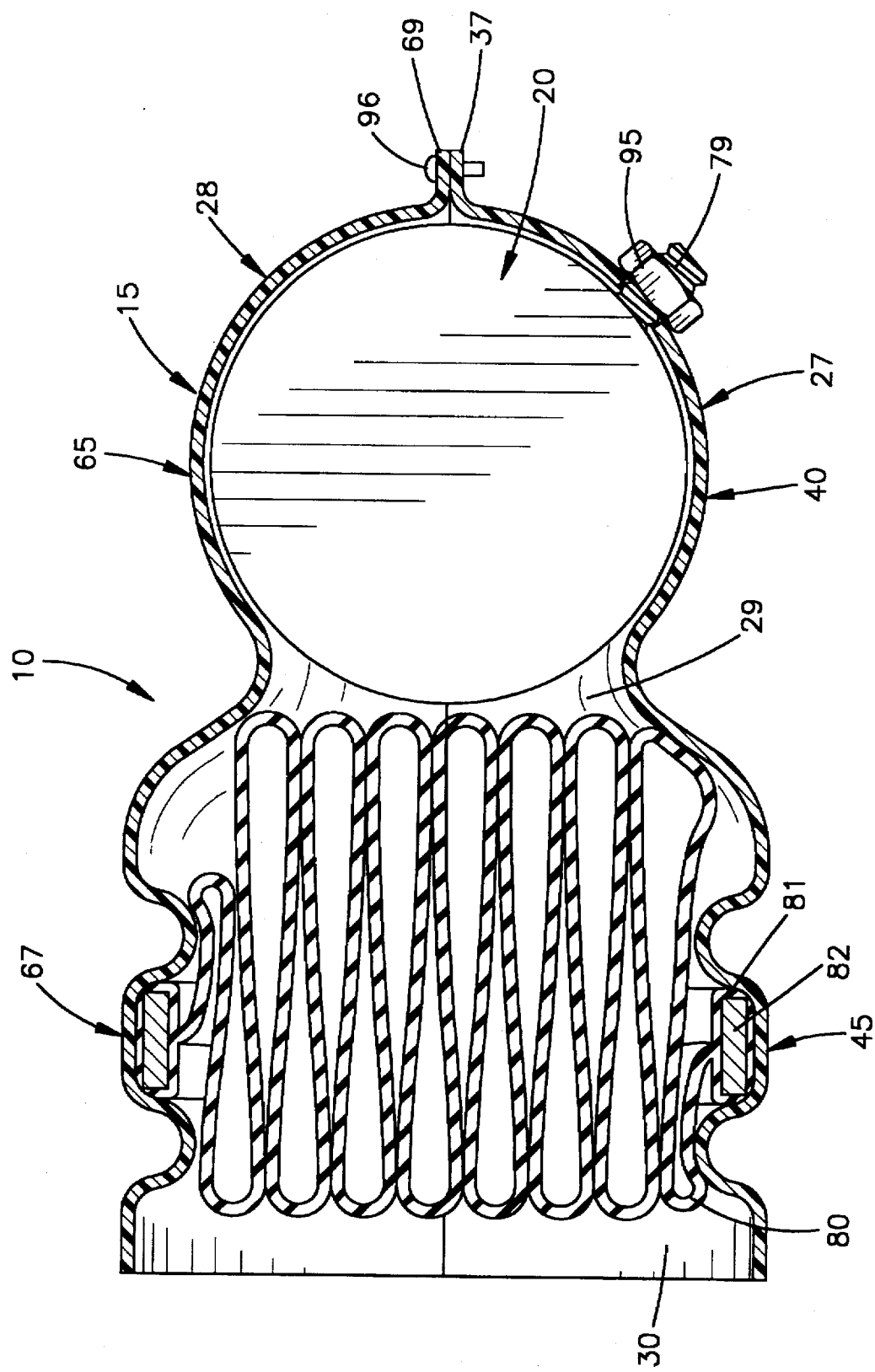
FIG. 4 is a sectional view of the airbag assembly 10, taken substantially along the plane described by the line 4—4 of FIG. 1.
Figure 5:
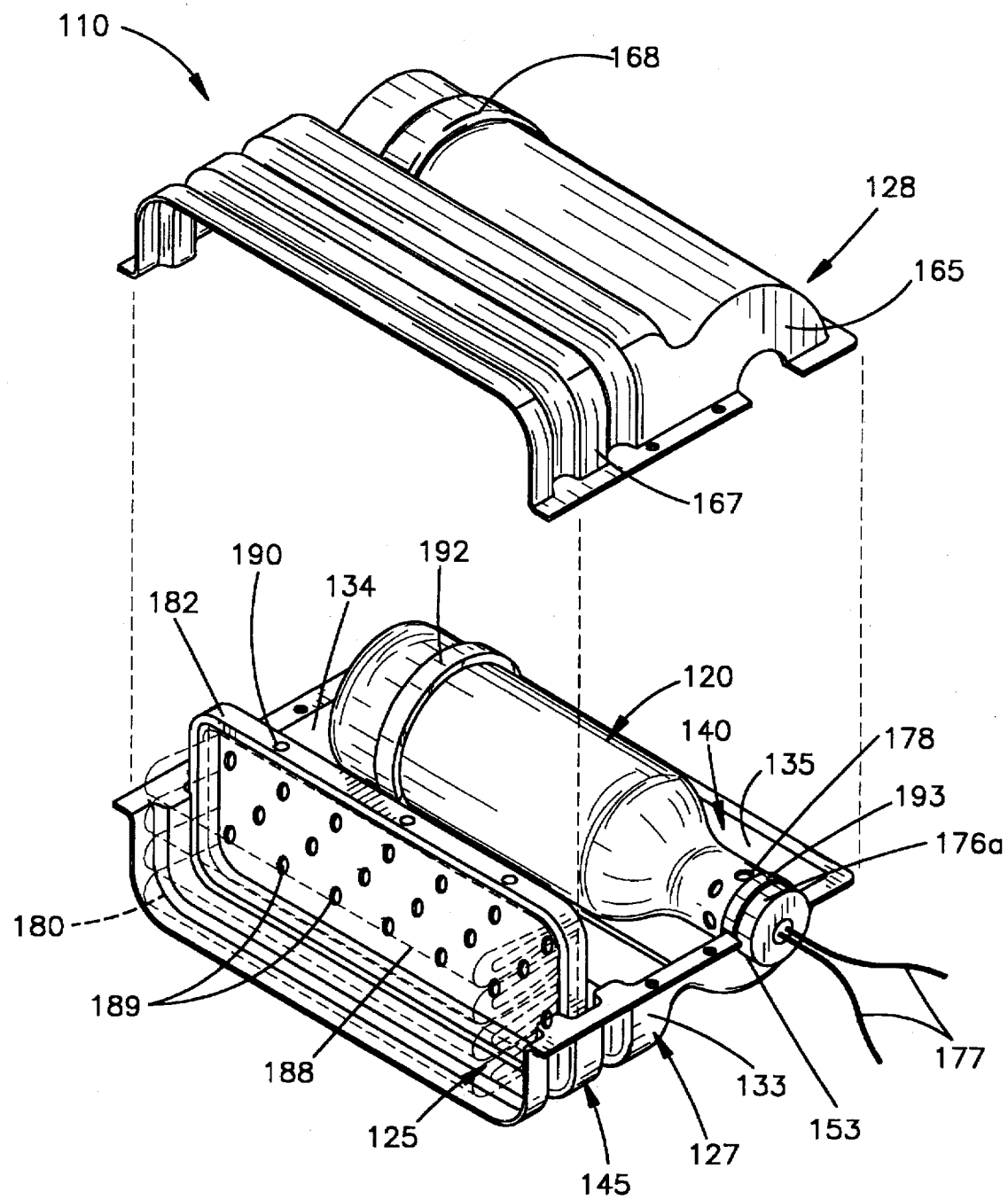
FIG. 5 is an exploded perspective view of an airbag assembly 110 according to the present invention.
Figure 5A:
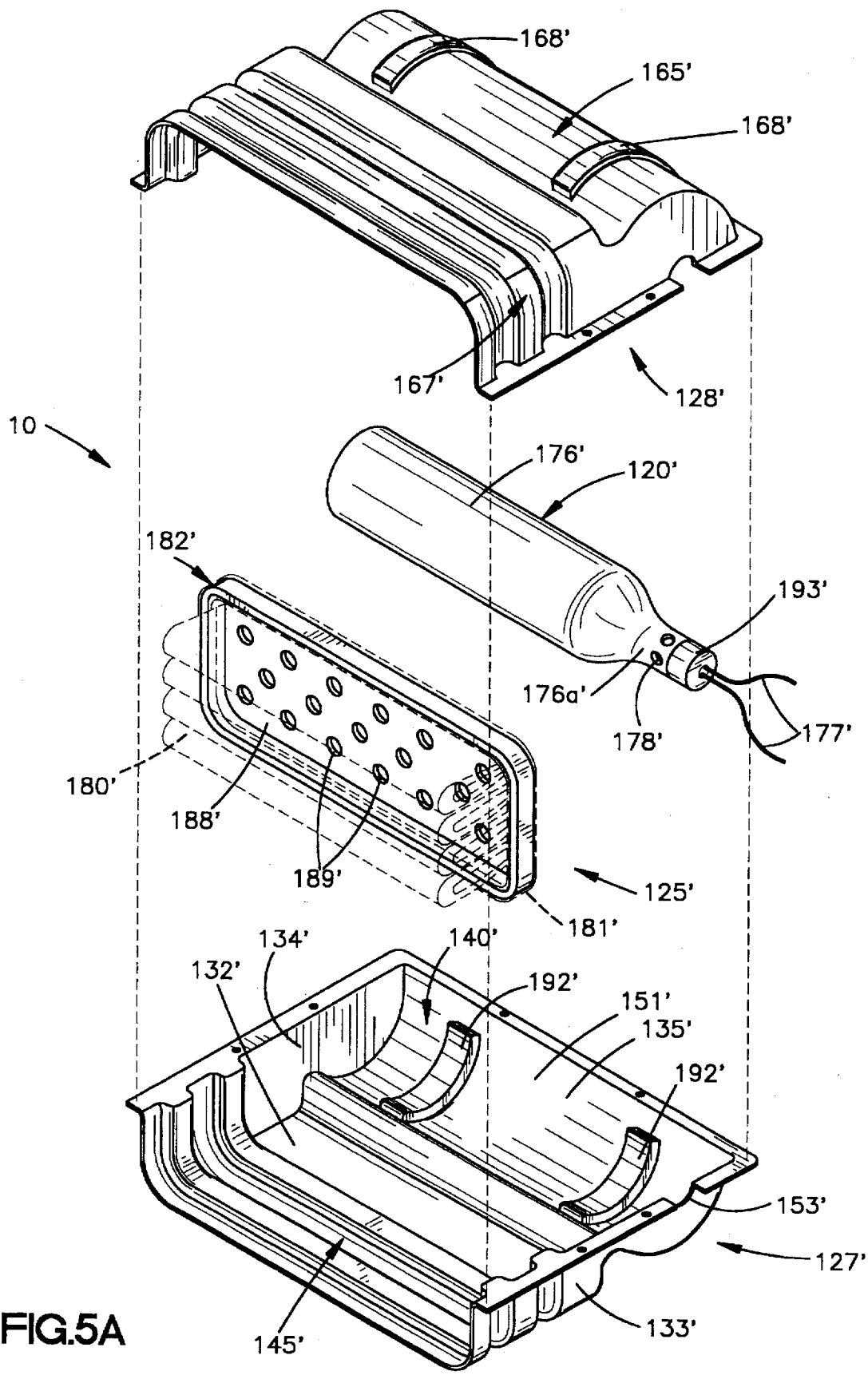
FIG. 5A is an exploded pre-assembly perspective view of a modified version of the airbag assembly 110, namely an airbag assembly 110'.
Figure 6:
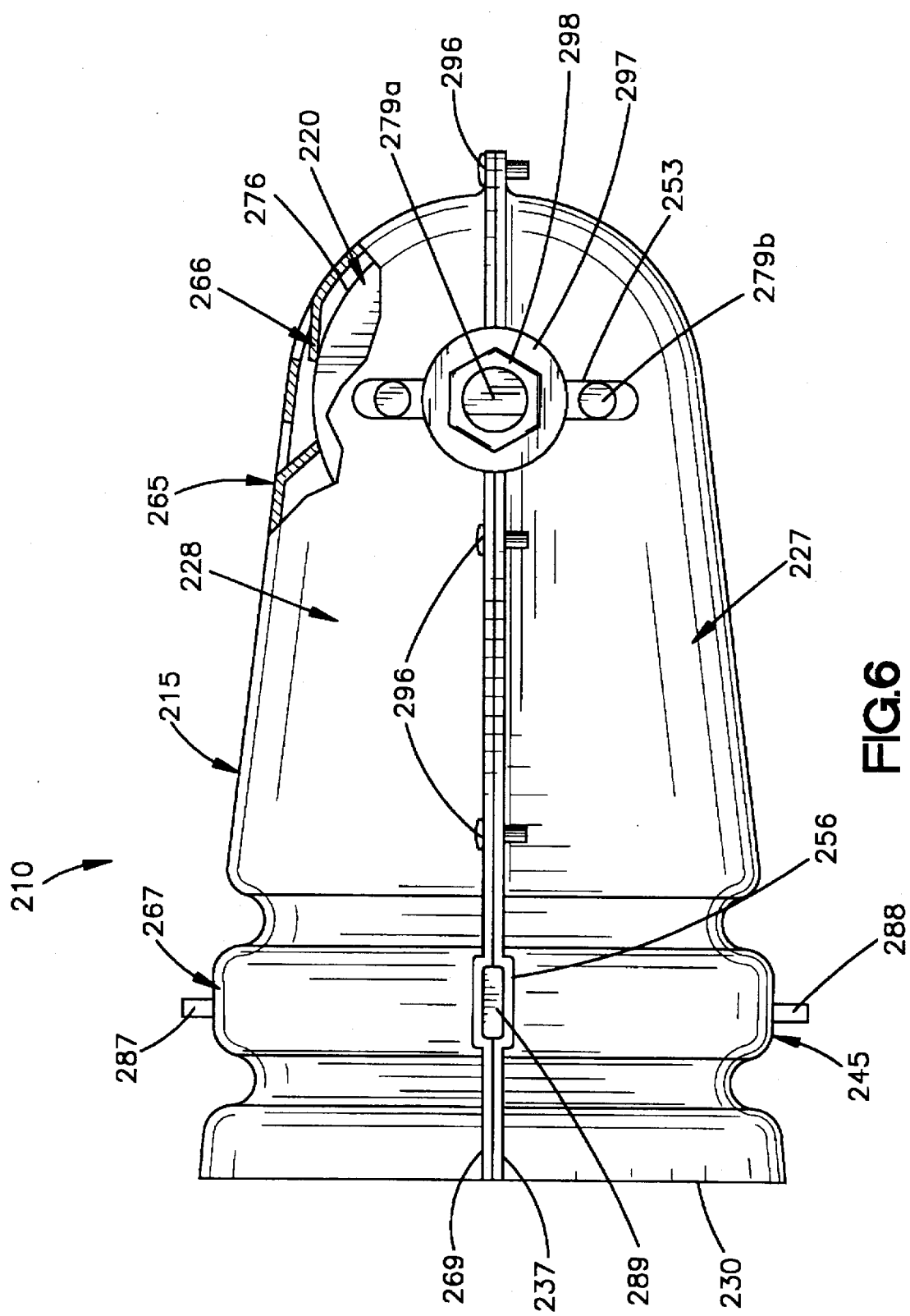
FIG. 6 is a side view of an airbag assembly 210 according to the present invention.
Figure 7:
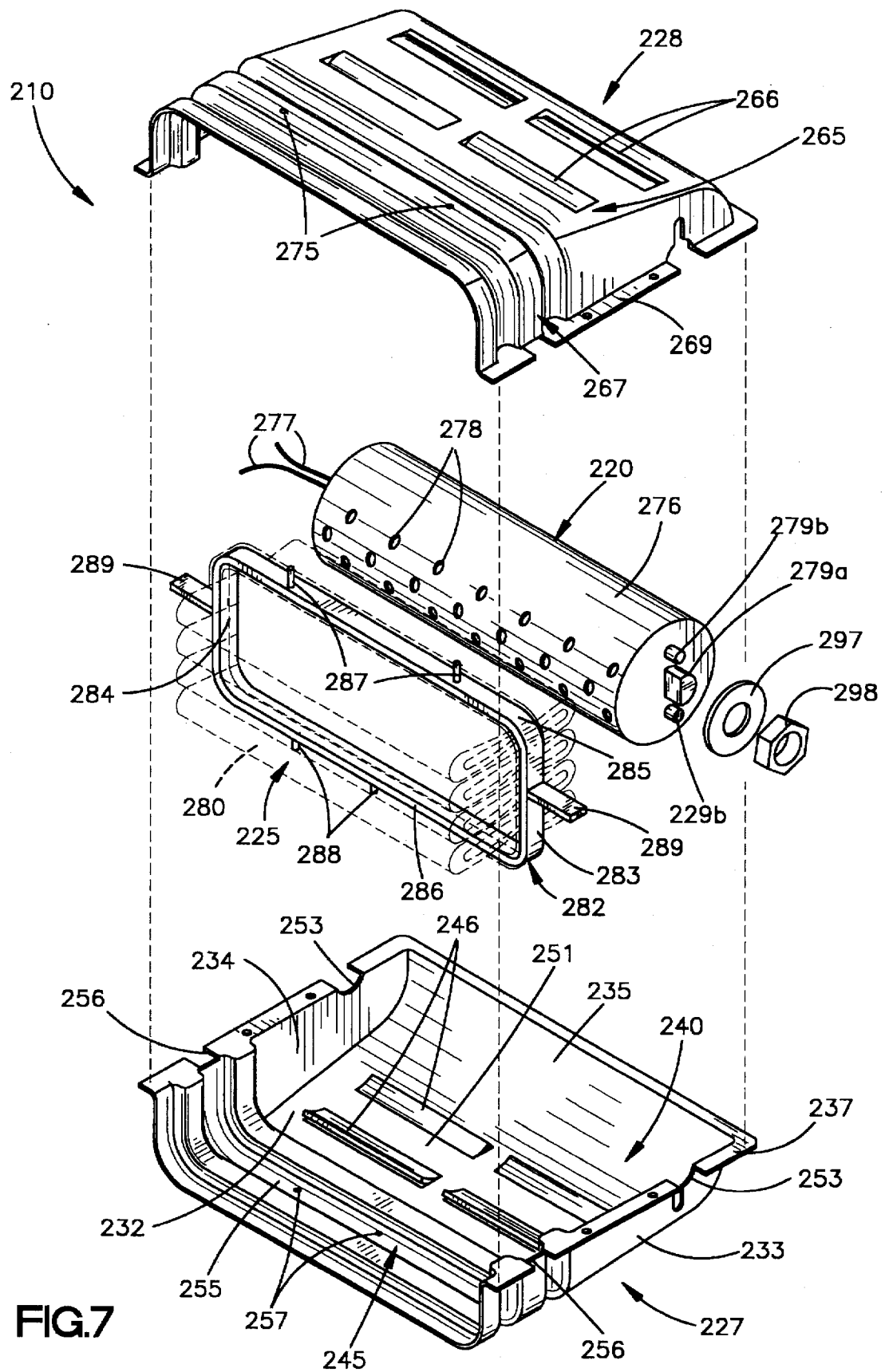
FIG. 7 is an exploded pre-assembly perspective view of the airbag assembly 210.
Figure 8:
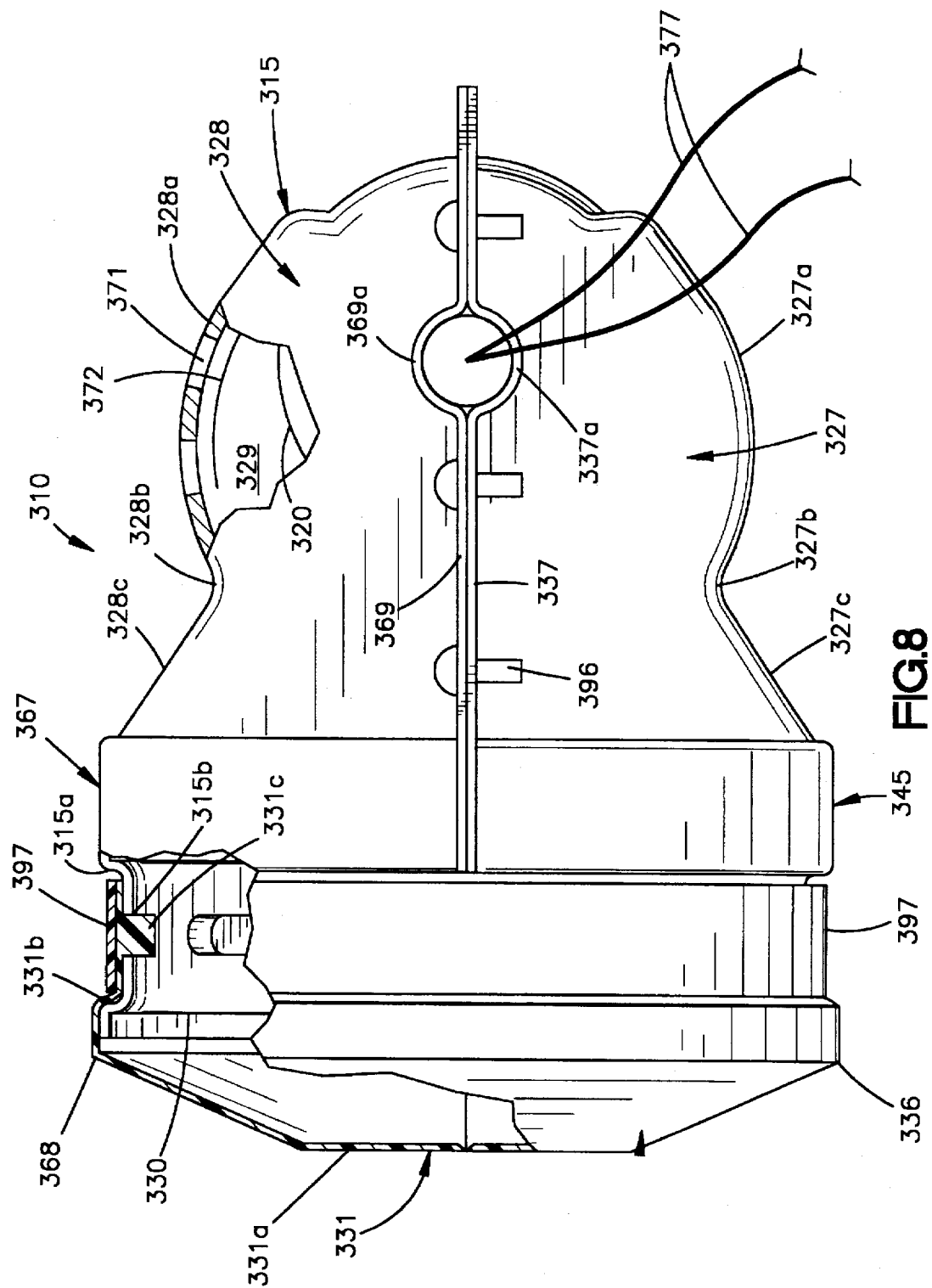
FIG. 8 is a side view, partially in section, of an airbag assembly 310 according to the present invention.
Figure 9:
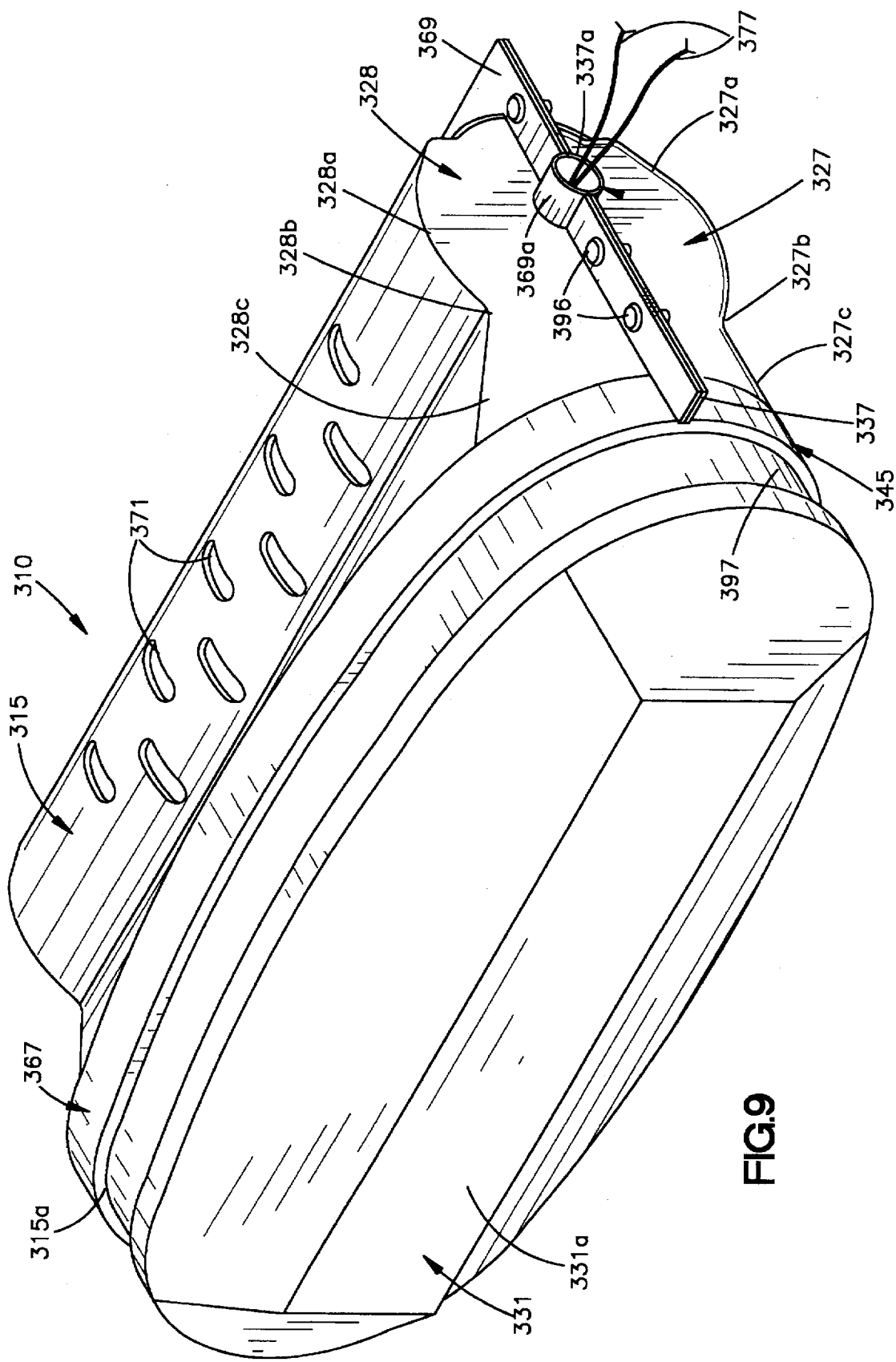
FIG. 9 is a front perspective view of the airbag assembly 310.
Figure 10:
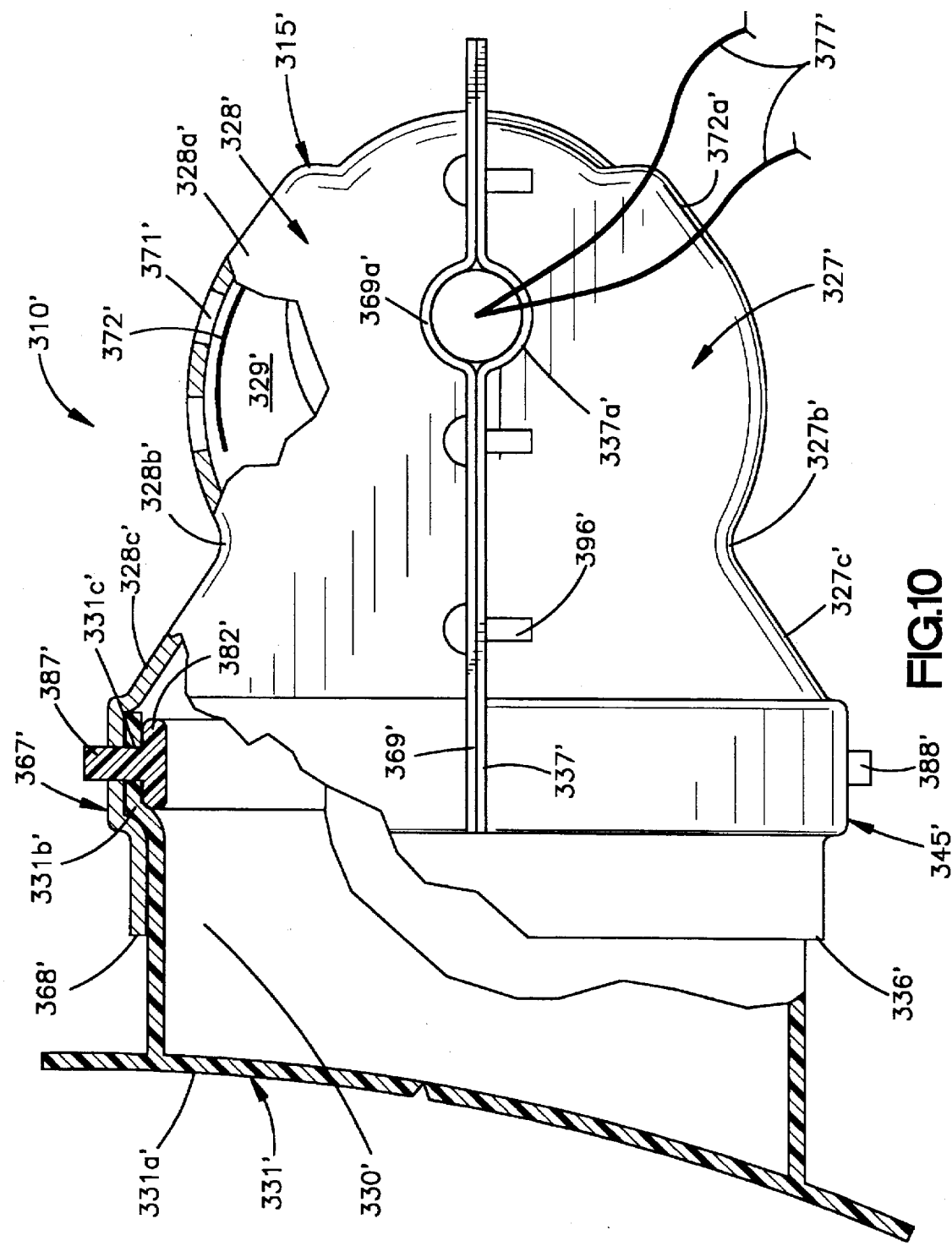
FIG. 10 is a side view, partially in section, of a modified version of the airbag assembly 310, namely an airbag assembly 310'.
Figure 11:
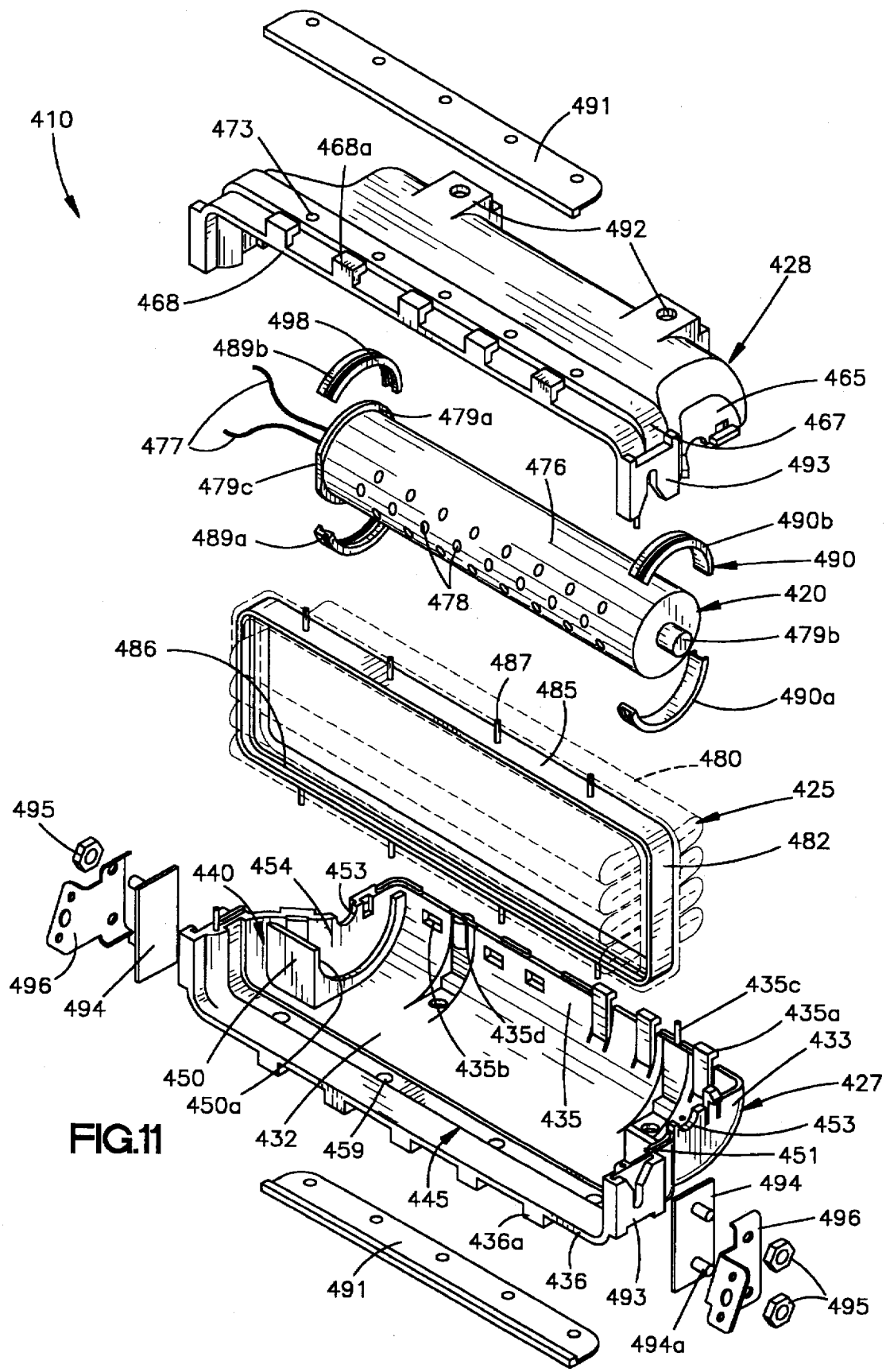
FIG. 11 is an exploded pre-assembly perspective view of an airbag assembly 410 according to the present invention.
Figure 12:
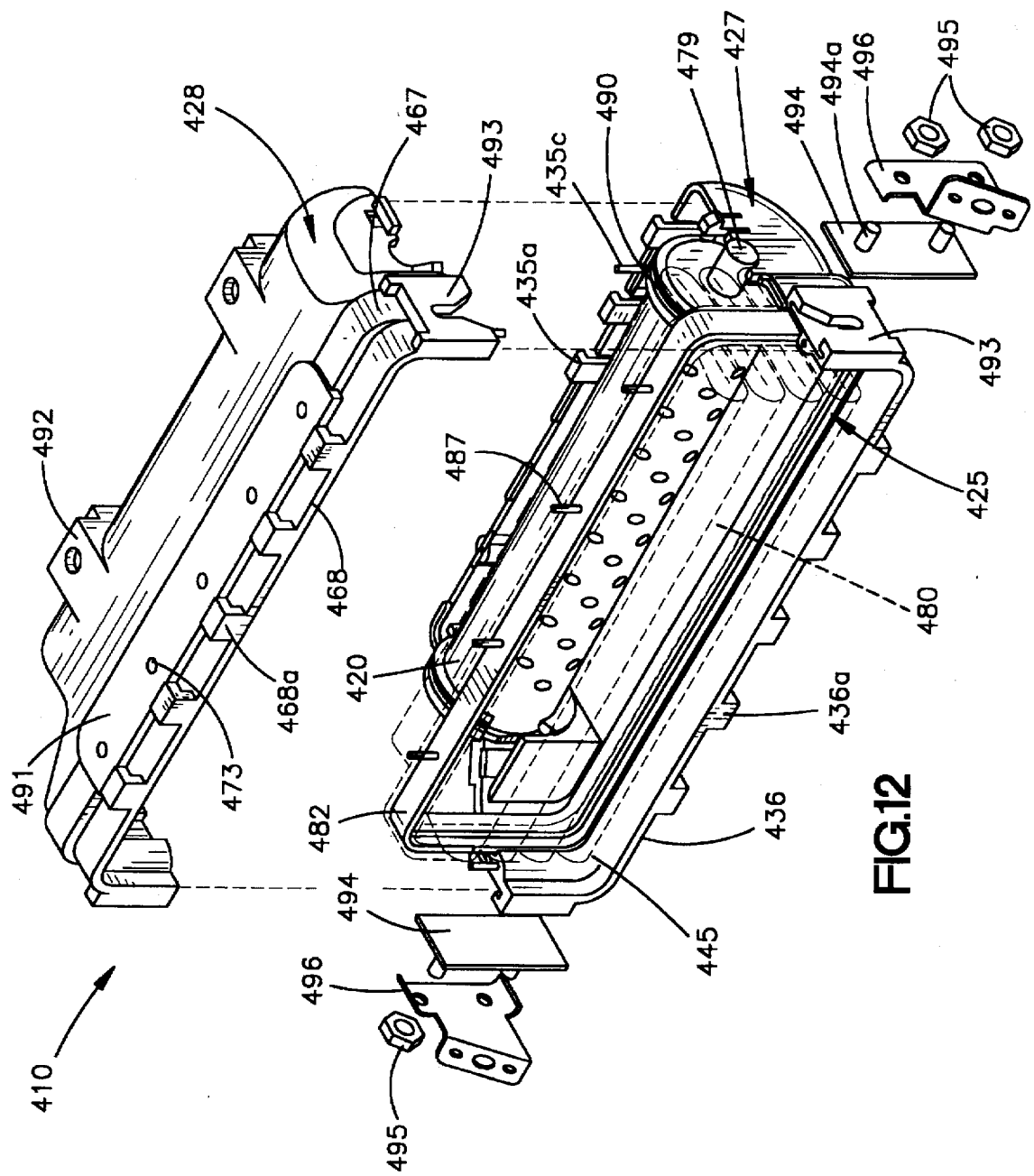
FIG. 12 is a perspective partially assembled view of the airbag assembly 410.
Figure 13:
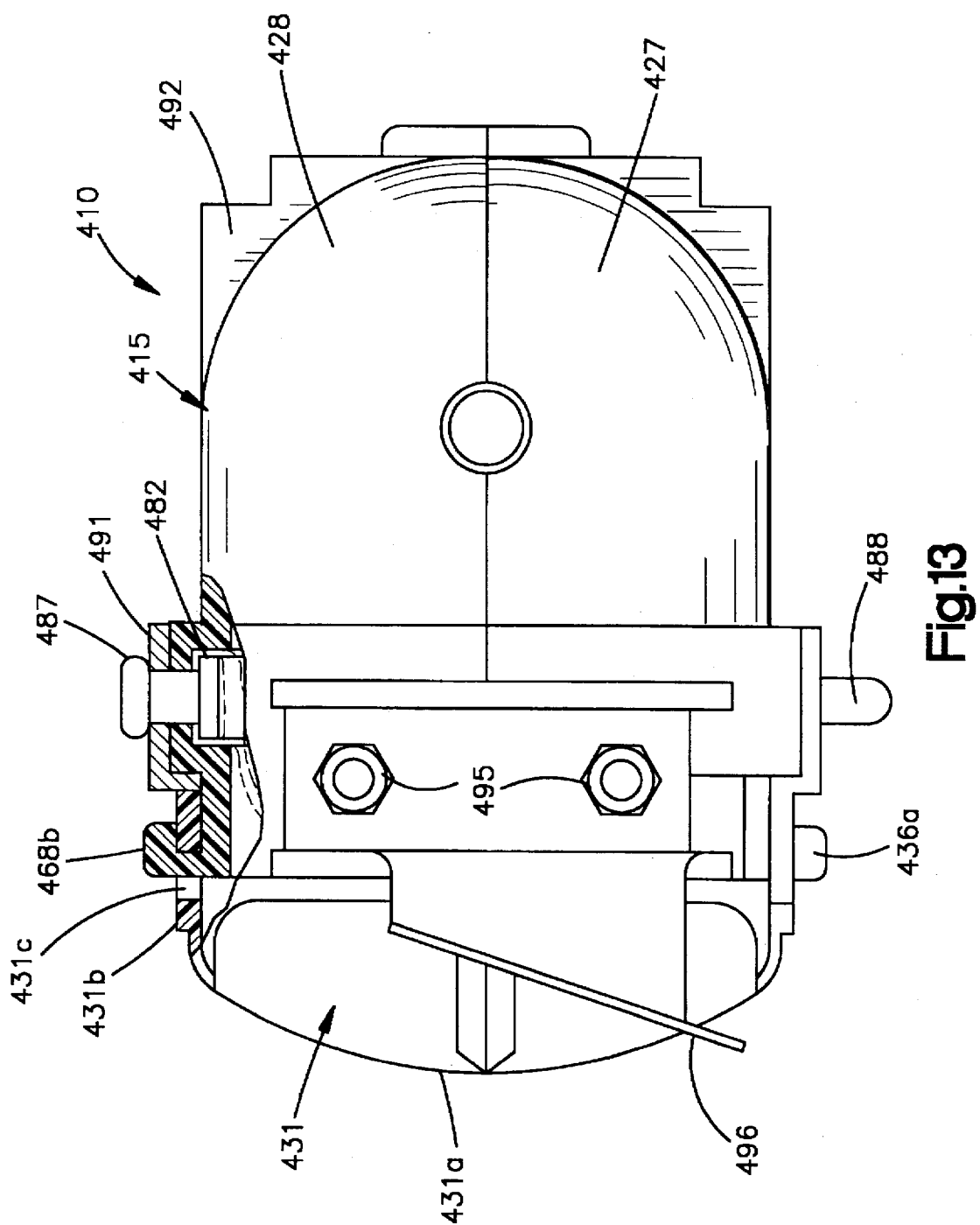
FIG. 13 is a side view, partially in section, of the airbag assembly 410.
Figure 14:
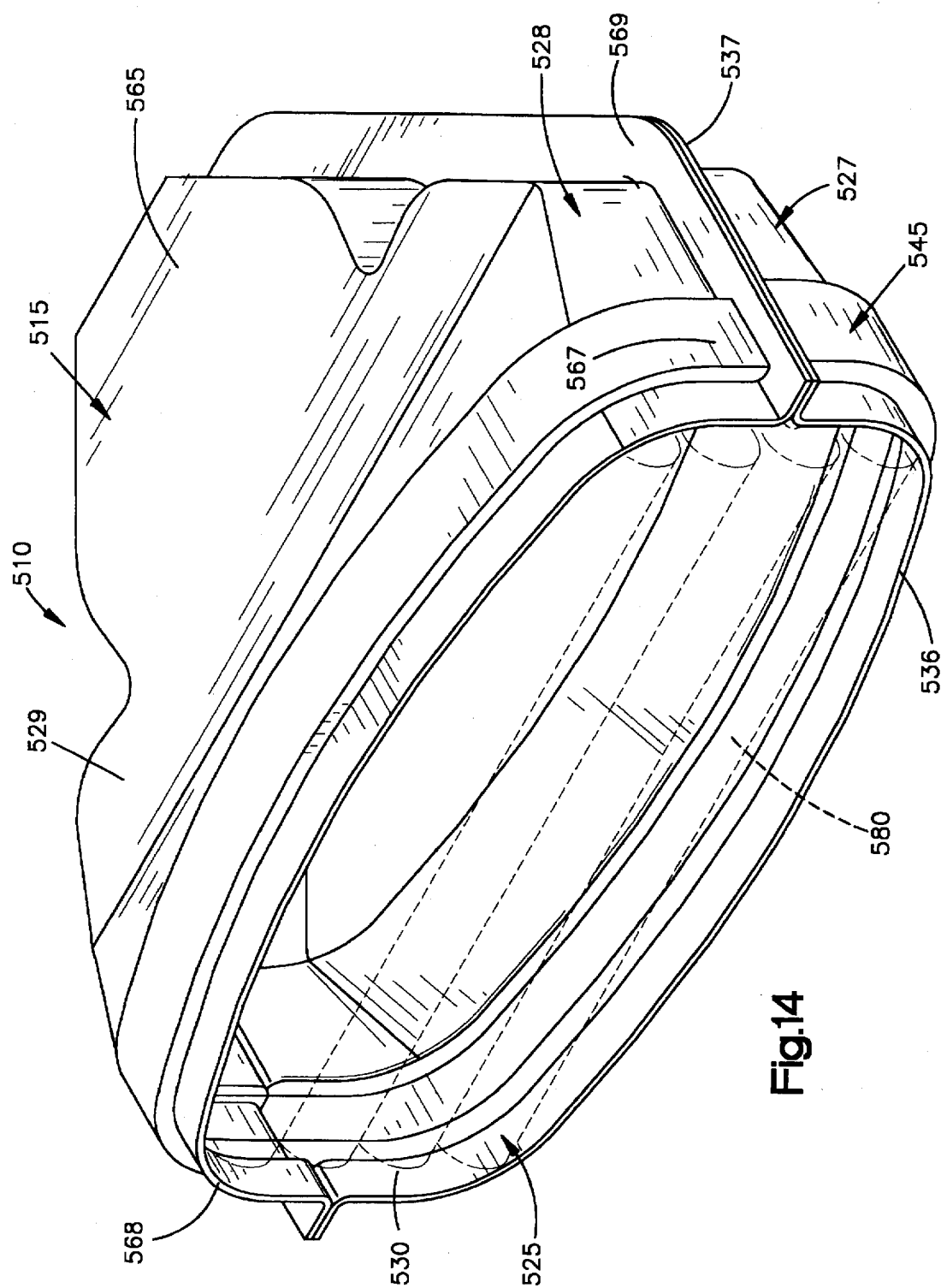
FIG. 14 is a perspective view of an airbag assembly 510 according to the present invention.
Figure 15:
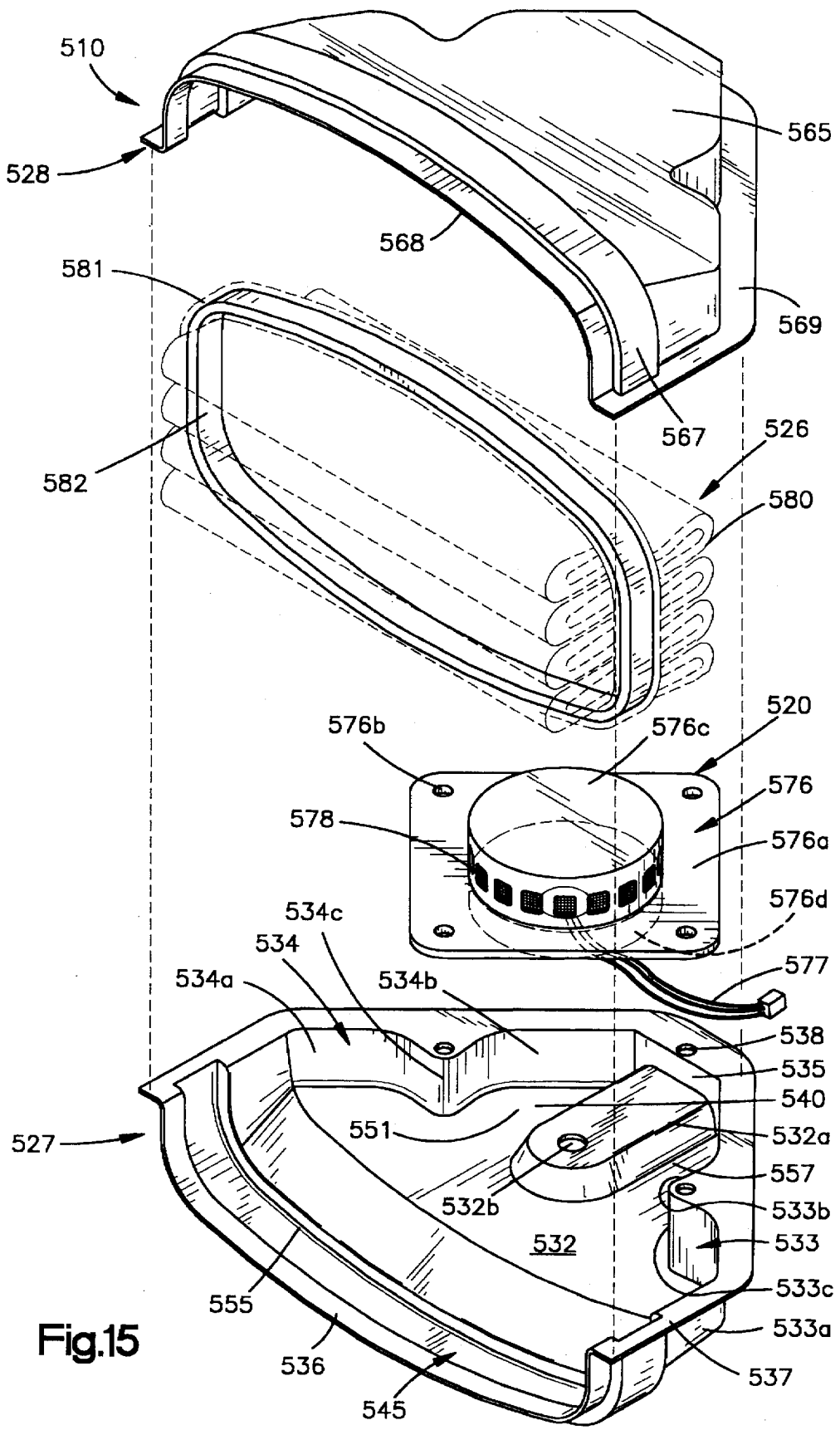
FIG. 15 is an exploded pre-assembly perspective view of the airbag assembly 510.

Referring now the drawings, various airbag assemblies according to the present invention are shown. Specifically, an airbag assembly 10 is shown in FIGS. 1–4, an airbag assembly 110 is shown in FIGS. 5–5A, an airbag assembly 210 is shown in FIGS. 6–7, an airbag assembly 310 is shown in FIGS. 8–10, an airbag assembly 410 is shown in FIGS. 11–13, an airbag assembly 510 is shown on FIGS. 14–18, an airbag assembly 610 is shown in FIGS. 19–22, and an airbag assembly 710 is shown in FIG. 23. As is explained in more detail below, each of the airbag assemblies according to the present invention includes a reaction device formed by a plurality of housing members adapted to be coupled together. In each assembly, the housing members are configured to capture and orient an inflator and/or an airbag in the cavity of the reaction device as the housing members are being coupled together. In this manner, the inflator and/or the airbag is coupled with the reaction device as the reaction device is being formed.

Airbag Assembly 10

The airbag assembly 10 (FIGS. 1–4) includes a reaction device 15, a cylindrical inflator 20 and an airbag 25. ("Cylindrical" in the context of the present application means a structure having an axial dimension substantially greater than its radial dimension.) The reaction device 15 includes a first housing member 27 and a second housing member 28. In the completed airbag assembly 10, the housing members 27 and 28 form a receptacle with a cavity 29 and a deployment opening 30. As is explained in more detail below, the housing members 27 and 28 are configured to capture and orient the cylindrical inflator 20 and the airbag 25 in the cavity 29 as the housing members are being coupled together. Although not specifically shown in the drawings, the airbag assembly 10 may also include a cover for the deployment opening 30. Such a cover would be designed to separate into segments during deployment of the airbag assembly 10.

The first and second housing members 27 and 28 are preferably formed by drawing or stamping aluminum, steel or other appropriate material into the desired shape. The first housing member 27 includes a base plate 32, generally parallel side walls 33 and 34, and a front wall 35. (See FIG. 2.) The side walls 33 and 34, and the front wall 35, are preferably formed in one piece with the base plate 32. The side walls 33 and 34 extend upwardly from opposite side ends of the base plate 32. The front wall 35 extends upwardly from the front end (i.e., the end closest to the inflator 20 in the completed airbag assembly 10) of the base plate 32 and interconnects the front ends of the side walls 33 and 34. The rear end (i.e., the end closest to the airbag 25 in the completed airbag assembly 10) of the base plate 32 and the rear ends of the side walls 33 and 34 together form a rear edge 36 which partially defines the deployment opening 30 in the completed reaction device 15.

The first housing member 27 further includes a flange 37 which extends at least partially around its periphery. More particularly, the flange 37 projects perpendicularly outward from the upper edges of the side and end walls 33, 34, and 35. (See FIG. 2.) Apertures 38 may be provided in the flange 37 for coupling the housing members 27 and 28 together and/or for coupling the reaction device 15 to a structural part of the vehicle.

The first housing member 27 further includes an inflator support structure 40 and an airbag support structure 45. The inflator support structure 40 comprises a generally U-shaped cradle 51 which is shaped and sized to surround the inflator 20 closely in the completed airbag assembly 10. The cradle 51 is formed by the front wall 35 and a ridge 52 which projects upwardly from the base plate 32. The ridge 52 preferably extends substantially parallel to the rear edge 36 and the front wall 35.

The inflator support structure 40 additionally includes a pair of semi-circular notches 53, one formed in each of the side walls 33 and 34, to accommodate certain components of the inflator 20. (The notches 53 cause a slight interruption in the flange 37.) The inflator support structure 40 also includes a pair of apertures 54 formed in the front wall 35. As is explained in more detail below, the apertures 54 cooperate with certain locating components of the inflator 20 to ensure that the inflator is correctly oriented in the completed airbag assembly 10.

The airbag support structure 45 includes a channel 55 having a base portion 56 and side portions 57 and 58. The base portion 56 is formed in the base plate 32 and the side portions 57 and 58 are formed in the side walls 33 and 34. The channel 55 extends substantially parallel to the rear edge 36 of the first housing member 27 and is configured to support the airbag 25 in a predetermined orientation.

The inflator support structure 40 and the airbag support structure 45 are preferably formed in one piece with the first housing member 27. For example, the ridge 52 of the inflator support structure 40 can be formed by appropriately drawing or stamping the base plate 32. The airbag support structure 45 can be formed by drawing or stamping the channel base portion 56 into the base plate 32 and by drawing or stamping the channel side portions 57 and 58 into the side walls 33 and 34.

The second housing member 28 is essentially identical to the first housing member 27. Accordingly, the second housing member 28 includes an inflator support structure 65, an airbag support structure 67, a rear edge 68, and a flange 69 with apertures 70. These components are substantially the same as analogous components in the first housing member 27, thus, only certain items are specifically numbered in the drawings. It may be noted however, that the second housing member 28 does not include a pair of apertures in its front wall analogous to the apertures 54 of the first housing member 27.

The inflator 20 comprises a cylindrical housing 76 which encloses a source of inflation fluid (not shown) such as a combustible chemical mixture and/or a quantity of gas. Squib wires 77 project outwardly from one end of the cylindrical housing 76 and are electrically connected to a collision sensor (not shown). A plurality of dispensing nozzles 78 are located on a rear portion of the cylindrical housing 76. At the onset of a collision, an ignition device (which includes the squib wires 77) ignites the chemical mixture and/or opens the container of gas. A large quantity of an inert, non-toxic gaseous inflation fluid, such as nitrogen, is thereby released and directed out of the inflator housing 76 through the nozzles 78. The arrangement of the nozzles 78 on the rear portion of the inflator housing 76 ensures that the inflation fluid is uniformly directed into the airbag 25.

To ensure that the inflator 20 is correctly oriented in the completed airbag assembly 10, locator members 79 are provided. The locator members 79 extend radially outward from a front portion of the housing 76. (See FIG. 4.) As is explained in more detail below, the locator members 79 cooperate with the apertures 54 in the front wall 35 of the first housing member 27 during assembly of the airbag assembly 10.

The inflator housing 76 may also be constructed in the manner set forth in U.S. Pat. No. 4,938,501, which is assigned to the assignee of the present invention.

The airbag 25 includes a folded inflatable bag 80 which is formed from a fabric such as nylon and which includes a mouth 81 defining an inflation fluid inlet. The airbag 25 also includes a retainer in the form of a continuous frame 82. The continuous frame 82 is generally rectangular in shape and includes parallel side members 83 and 84 and parallel top and bottom members 85 and 86. The frame 82 is preferably formed in one piece from a relatively rigid material, such as aluminum, steel or a polymeric material. The continuous frame 82 is attached to the mouth 81 of the bag 80 by a suitable attachment technique, for example, stitching or adhesives. Preferred attachment techniques are set forth in U.S. patent application Ser. No. 07/629,427 which is entitled "Vehicle Air Bag Module and Method of Assembly" and which is assigned to the assignee of the present invention.

In the assembly of the airbag assembly 10, the inflator 20 and the airbag 25 are initially placed in predetermined orientations in the first housing member 27. More particularly, the continuous frame 82 of the airbag 25 is appropriately positioned within the channel 55 of the airbag support structure 45. (See FIG. 3.) When appropriately positioned, the frame bottom member 86 is located within the base portion 56 of the channel 55. (See FIG. 4.) Additionally, the frame side members 83 and 84 are partially located within, and project upwardly from, the side portions 57 and 58 of the channel 55.

When the inflator 20 is placed in its predetermined orientation in the first housing member 27, it is properly positioned within the cradle 51 of the inflator support structure 40. (See FIG. 2.) In this position, the squib wires 77 of the inflator 20 extend outwardly through either the notch 53 in the side wall 33 or the notch 53 in the side wall 34. Additionally, the locator members 79, which extend radially outward from the inflator housing 76, are received by the apertures 54, which are located in the front wall 35 of the first housing member 27. The positioning of the locator members 79 and the apertures 54 allows only one orientation of the inflator 20. In this orientation, the squib wires 77 extend through the notch 53 in the side wall 33. Further, in this orientation, the dispensing nozzles 78 are properly positioned relative to the deployment opening 30. If necessary or desirable, nuts 95 (or another suitable fastener) can be drawn down on the locator members 79.

Once the inflator 20 and the airbag 25 have been properly positioned within the first housing member 27, the second housing member 28 is placed adjacent to (or, in the illustrated orientation, placed over) the first housing member 27. More particularly, the second housing member 28 is aligned with the first housing member 27 in such a manner that the inflator 20 and the airbag 25 are supported in predetermined orientations within the cavity 29. In these predetermined orientations, the inflator 20 is supported between the cradles of the first and second inflator support structures 40 and 65, while the airbag 25 is supported between the channels of the first and second airbag support structures 45 and 67. When the first and second housing members 27 and 28 are aligned in this manner, the peripheral flanges 37 and 69 are located in adjacent, side-by-side relation, and the apertures 38 and 70 are aligned with each other.

The first and second housing members 27 and 28 are then coupled together using any suitable method. For example, conventional fasteners, such as rivets 96, may be inserted through the apertures 38 and 70. Additionally or alternatively, the edges of the flanges 37 and 69 may be crimped together. In any event, the outward perpendicular projection of the flanges 37 and 69 will facilitate the coupling together of the housing members 27 and 28 by automated mass production assembly techniques.

Airbag Assembly 110

The airbag assembly 110 (FIG. 5) includes a reaction device, a cylindrical inflator 120 and an airbag 125. (Again, "cylindrical" in the context of the present application means a structure having an axial dimension substantially greater than its radial dimension.) The reaction device includes a first housing member 127 and a second housing member 128. These housing members are configured to capture and orient the cylindrical inflator 120 and the airbag 125 in the cavity of the reaction device as the housing members are being coupled together.

The housing members 127 and 128, and thus the reaction device of the airbag assembly 110, are in many ways similar to the analogous components of the airbag assembly 10. For example, the first housing member 127 includes an inflator support structure 140 and an airbag support structure 145. The second housing member 128 includes an inflator support structure 165 and an airbag support structure 167.

The airbag support structures 145 and 167 are essentially identical to the airbag support structures 45 and 67 of the airbag assembly 10. However, the inflator support structures 140 and 165 differ slightly from the inflator support structures 40 and 65 of the airbag assembly 10. Specifically, the semi-circular notch 153 on the side wall 133 of the first housing member 127, and the semi-circular notch on the corresponding side wall of the second housing member 128, are sized to accommodate a portion of the inflator housing, rather than to function simply as an outlet port for the squib wires. Additionally, the cradle of the inflator support structure 140 includes a semi-circular trough to accommodate certain orientation components of the airbag assembly 110. (The trough of the first housing member 127 is not visible in the illustrated view, but the trough 168 of the second housing member 128 is shown.) A semi-circular notch is not provided on the side wall 134 of the first housing member 127 and a semi-circular notch is likewise not provided on the corresponding side wall of the second housing member 128. Additionally, the front wall 135 of the first housing member 127 does not include apertures analogous to the inflator-alignment apertures 54 in the front wall 35 of the airbag assembly 10.

The inflator 120 comprises a cylindrical housing 176 which contains a source of inflation fluid (not shown). In the illustrated inflator 120, the cylindrical housing 176 is bottle-shaped and includes a neck 176a. The source of inflation fluid preferably comprises an inert, non-toxic pressurized gas, such as argon, nitrogen or air, which may be heated and/or supplemented by a mixture of combustible materials.

Squib wires 177 project outwardly from the distal end of the neck 176a and are electrically connected to a collision sensor (not shown). A plurality of dispensing nozzles 178 are located around the entire periphery of the neck 176a of the bottle-shaped housing 176. At the onset of a collision, an activation assembly (which includes the squib wires 177) releases the pressurized inflation fluid so that it flows through the nozzles 178 in a 360° pattern. This pattern of fluid flow results in the inflator 120 being a "neutral-thrust" inflator.

Because the dispensing nozzles 178 are arranged in a 360° pattern around the inflator housing 176 (as opposed to being located only on a rear portion of the housing as in the inflator 20), the inflation fluid is not all directed towards the airbag 125. As such, inflators such as the inflator 120 are often used in conjunction with a diffuser which is designed to direct the inflation fluid uniformly into the airbag 125. In the illustrated airbag assembly 110, a diffuser is incorporated into the airbag 125, as is explained in more detail below. However, alternatively, a diffuser could be incorporated into the inflator housing. A further alternative is to provide a separate cylindrical diffuser, which is dimensioned to surround the inflator housing. (See e.g., U.S. Pat. No. 5,131,680 which is assigned to the assignee of the present invention.) It should be noted that with some inflators, a diffuser may not be necessary.

The airbag 125 includes a folded inflatable bag 180, a retainer in the form of a rectangular continuous frame 182, and a diffuser plate 188. The bag 180 and the continuous frame 182 are of the same general shape and construction as the bag 80 and the frame 82 of the airbag assembly 10. The diffuser plate 188 may be made of the same material as the frame 182 (i.e., aluminum, steel or a polymeric material). In the illustrated airbag assembly 125, the plate 188 is attached to, or formed in one piece with, the continuous frame 182 in such a manner that it interconnects the top, bottom and side members of the frame. (The plate 188 could constitute only a partial cover if necessary or desired.) The plate 188 includes a plurality of openings or slots 189. In the completed airbag assembly 110, the plate 188 and the inflator support structures 140 and 167 together form a mixing chamber around the inflator 120. In this manner, inflation fluid flows through the nozzles 178 in a 360° pattern, into the mixing chamber, through the openings 189 in the diffuser plate 188, and into the bag 180.

The continuous frame 182, with the diffuser plate 188 secured to the frame, may be attached to the bag 180 in the same manner as the frame 82 is attached to the bag 80. Alternatively, and as illustrated, apertures 190 may be provided in the continuous frame 182 so that the mouth of the bag 180 may be attached to the frame 82 by suitable fasteners, such as rivets (not shown). If the latter method of attachment is used, the bag 180 is preferably provided with welting around its mouth.

Instead of the diffuser being attached to the frame 182, a separate diffuser plate could be formed with frontwardly extending peripheral flanges. In the completed airbag assembly 110, the flanges would be captured between the frame 182 and the rectangular channel formed by the airbag support structures 145 and 167. In this modified version of the airbag 125, the diffuser plate would also be captured and oriented by the housing members 127 and 128 as they are being coupled together.

The airbag assembly 110 further includes a mounting cushion 192 and a gas seal/mounting cushion 193. The mounting cushion 192 is a ring-like structure made of a resilient material. In the completed airbag assembly 110, the mounting cushion 192 is positioned around the wider (i.e. non-necked) portion of the inflator housing 176 and positioned within the semi-circular trough of the inflator support structures 140 and 165. The gas seal/mounting cushion 193 is a cylindrical structure made of a material which is resilient and which is also substantially impervious to the inflation fluid. In the completed airbag assembly 110, the gas seal/ mounting cushion 193 is positioned around the distal end of the inflator neck 176a (beyond the nozzles 178) and is positioned between the notch 153 in the side wall 133 of the first housing member 127 and the analogous notch in the side wall of the second housing member 128.

In the assembly of the airbag assembly 110, the mounting cushions 192 and 193 are initially positioned around the inflator 120. Thereafter, the assembly of the airbag assembly 110 is essentially the same as the assembly of the airbag assembly 10. Specifically, the airbag 125 and the inflator 120 are initially placed in predetermined orientations in the first housing member 127. The placement of the inflator 120 particularly includes locating the bottle-shaped inflator housing 176 within the cradle of the inflator support structure 140 in such a manner that the mounting cushion 192 rests within the semi-circular trough and the mounting cushion 193 rests in the semi-circular notch 153. One advantage of the inflator 120 is that it does not have to be radially aligned within the reaction device. In other words, because the nozzles 178 are arranged in a 360° pattern, the inflator 120 may be located in any rotational orientation within the inflator support structure 140. Accordingly, inflator orientation components (such as the apertures 54 and the locator members 79 of the airbag assembly 10) are not necessary.

The second housing member 128 is then placed over, and aligned with, the first housing member 127. When properly aligned, the mounting cushion 192 is positioned between the troughs of the first and second inflator support structures. Additionally, the distal end of the inflator neck 176a will project through the opening formed by the semi-circular notches of the housing members 127 and 128. In this manner, the squib wires 177 may extend outwardly from the reaction device in the completed airbag assembly 110. The mounting cushion 193 forms a gas seal to minimize the escape of inflation fluid during deployment of the airbag assembly 110. Additionally, because of the resilient nature of the mounting cushions 192 and 193, they are able to accommodate slight size variations in the inflator housing 176 caused by temperature changes.

Thereafter, the housing members 127 and 128 are coupled together using any suitable method, such as the methods discussed above in conjunction with the assembly of the airbag assembly 10. It is important, however, that the flanges of the housing members 127 and 128 be tightly sealed to prevent the escape of inflation fluid. Otherwise, there will be increased likelihood of the loss of fluid due to the 360° pattern of the dispensing nozzles 178.

A modified version of the airbag assembly 110, namely an airbag assembly 110', is shown in FIG. 5A. (Analogous parts are designated by like reference numerals, with the parts of the airbag assembly 110' being followed by a single prime (').) The cradle of the inflator support structure 140' includes a pair of semi-circular troughs to accommodate certain orientation components of the airbag assembly 110'. (The troughs of the first housing member 127' are not visible in the illustrated view, but the troughs 168' of the second housing member 128' are shown.)

Instead of a ring-like mounting cushion 192, the airbag assembly 110' includes two pairs of arc-shaped mounting cushions 192'. (The bottom pair of cushions 192 are shown, but the top pair of cushions are not visible in the illustrated view.) In the completed airbag assembly 110', the mounting cushions 192' are positioned around the wider (i.e. non-necked) portion of the inflator housing 176' and positioned within the semi-circular troughs of the inflator support structures 140' and 165'.

The airbag assembly 110' additionally includes a cylindrical gas seal/mounting cushion 193'. In the illustrated airbag assembly 110', the gas seal/mounting cushion 193' is positioned around the squib wires 177' and will be positioned between the notch 153' in the side wall 133' of the first housing member 127' and the analogous notch in the side wall of the second housing member 128' in the completed airbag assembly. However, it is possible to locate the squib wires 177' in different places within the reaction device.

In the assembly of the airbag assembly 110', the mounting cushions 192' are initially placed in the semi-circular troughs of the inflator support structures 140' and 165'. Additionally, the mounting cushion 193' is placed around the squib wires 177' of the inflator 120'. Thereafter, the assembly of the airbag assembly 110' is essentially the same as the assembly of the airbag assembly 110.

Airbag Assembly 210

The airbag assembly 210 (FIGS. 6–7) includes a reaction device 215, a cylindrical inflator 220 and an airbag 225. The reaction device 215 includes a first housing member 227 and a second housing member 228. These housing members are configured to capture and orient the inflator 220 and the airbag 225 in the cavity of the reaction device 215 as the housing members are being coupled together.

The housing members 227 and 228, and thus the reaction device 215, are in many ways similar to the analogous components of the airbag assembly 10. However, in the airbag assembly 210, the side walls 233 and 234 of the first housing member 227 are tapered in height from the rear to the front. The side walls of the second housing member 228 are similarly tapered. Thus, when the first and second housing members 227 and 228 are coupled together, the height of the reaction device 215 increases toward the deployment opening 230. (See FIG. 6.) This tapered shape is believed to aid in the aspiration of air into the reaction device 215 during the inflation process.

The first housing member 227 includes an inflator support structure 240 and an airbag support structure 245. These structures are similar to, but not the same as, the analogous structures of the airbag assembly 10. More particularly, the inflator support structure 240 includes a series of spring-like sections or fingers 246 designed to flexibly engage the inflator 220. The fingers 246 are preferably formed in one piece with the first housing member 227, and more preferably are formed by die-cutting its base plate 232. In the illustrated airbag assembly 210, the fingers 246 are arranged in two rows to form a cradle 251 for receiving the inflator 220.

The fingers 246 are designed to bend slightly to conform to the outer dimensions of the inflator 220. As is explained in more detail below, this feature of the inflator support structure 240 is believed to make the reaction device 215 compatible with a range of inflators. Additionally, the fingers 246 are also believed indirectly to facilitate inflation of the airbag 225. Particularly, the openings formed by the die-cutting of the fingers 246 in the housing member 227 allow air to be drawn into the reaction device 215 during the inflation process.

Another difference between the inflator support structure 240 of the airbag assembly 210 and the inflator support structure 40 of the airbag assembly 10 is the design of the inflator orienting components. Particularly, the notch 253 in the side wall 233 of the first housing member 227 differs from the semi-circular notch 53. (The notch 253 in the side wall 234 is essentially the same as the notch 53 in the side wall 34 of the airbag assembly 10.) More particularly, the upper portion of the notch 253 is shaped to accommodate the bottom half of a D-shaped stud and the lower portion of the notch constitutes an elliptical slot. Thus, the notch 253 has a non-symmetrical shape. Additionally, the front wall 235 of the first housing member 227 does not include apertures analogous to the inflator-alignment apertures 54 in the front wall 35 of the airbag assembly 10.

The airbag support structure 245 of the first housing member 227 is almost identical to the airbag support structure of the airbag assembly 10 except that it includes rectangular notches 256 formed in the upper ends of the channel 255. (The notches 256 cause interruptions in the flange 237.) As is explained in more detail below, the notches 256 accommodate certain components of the airbag 225. Additionally, in contrast to the airbag support structure 45 of the airbag assembly 10, apertures 257 are formed in the base portion of the channel 255. It may be noted for future reference that the apertures 257 are spaced relatively close to each other.

The second housing member 228 includes an inflator support structure 265 (which includes fingers 266) and an airbag support structure 267. The inflator support structure 265 of the second housing member 228 is essentially identical to the inflator support structure 240 of the first housing member 227. The airbag support structure 267 of the second housing member 228 is essentially the same as the airbag support structure 245 of the first housing member 227 except for the spacing of the apertures in the channel. Specifically, the apertures 275 formed in the channel of the airbag support structure 267 are spaced farther apart than the apertures 257. As is explained in more detail below, this spacing insures the correct orientation of the airbag 225 relative to the reaction device 215.

The inflator 220 comprises a cylindrical housing 276 which encloses a source of inflation fluid (not shown) such as a combustible chemical mixture and/or a quantity of gas. Squib wires 277 project outwardly from one end of the cylindrical housing 276 and are electrically connected to a collision sensor (not shown). A plurality of dispensing nozzles 278 are located on a rear portion of the cylindrical housing 276. The inflator 220 additionally includes orientation components, particularly a threaded D-shaped stud 279a and a pair of locator pins 279b. These orientation components extend outwardly from one end of the housing 276, specifically the end opposite the squib wires 277.

A cylindrical inflator which may be used in the airbag assembly 210 is disclosed in U.S. Pat. No. 4,938,501 to Wipasuramonton which is assigned to the assignee of the present invention.

The airbag 225 includes a folded inflatable bag 280 and a retainer in the form of a continuous frame 282. The bag 280 and the frame 282 are generally of the same construction as the analogous components 80 and 82 of the airbag assembly 10. However, in the frame 282, locator studs 287 project upwardly from the top member 285 and locator studs 288 project downwardly from the bottom member 286. The locator studs 287 and 288 are preferably integrally formed with the upper and lower members of the continuous frame 282. Additionally, in contrast to the bag 80 of the airbag assembly 10, the mouth of the bag 280 includes holes (not specifically shown) arranged to receive the locator studs 287 and 288. In the assembly process, the locator studs 287 and 288 coordinate with the apertures 257 and 275 in the airbag support structures. Consequently, the locator studs 287 are spaced differently (i.e. farther apart) than the locator studs 288.

The continuous frame 282 additionally includes (in contrast to the frame 82 of the airbag assembly 10) a pair of tabs 289. The tabs 289 are preferably formed in one piece with, and project outwardly from, the side members 283 and 284 of the continuous frame 282. The tabs 289 provide additional support for the continuous frame 282 and discourage dislodgement of the frame 282 from the reaction device 215 during deployment of the airbag assembly 210. However, the use of a "tab-less" frame 282 in the airbag assembly 210 is possible with, and contemplated by, the present invention.

The assembly of the airbag assembly 210 is essentially the same as the assembly of the airbag assembly 10. Specifically, the airbag 225 and the inflator 220 are initially placed in predetermined orientations in the first housing member 227. The placement of the airbag 225 includes inserting the locator studs 288 through the apertures 257 of the first airbag support structure 245. The different spacing arrangement of the apertures 257 and 275, and the different spacing arrangement of the locator studs 287 and 288, ensures that the airbag 225 is correctly oriented relative to the reaction device 215. The placement of the airbag 225 also includes positioning the tabs 289 of the continuous frame 282 in the notches 256 formed on the upper ends of the airbag-supporting channel 255.

The placement of the inflator 220 particularly includes positioning the inflator 220 within the cradle 251 formed by the fingers 246. When correctly positioned, the D-shaped stud 279a and the lower locator pin 279b are received within the slot 253 in the side wall 233. The non-symmetrical shape of the D-shaped stud 279a, and the corresponding non-symmetrical shape of the slot 253, ensures that the inflator nozzles 278 are correctly oriented relative to the deployment opening 230. In this position, the squib wires 277 of the inflator 220 extend outwardly through the notch 253 in the side wall 234.

The second housing member 228 is then placed over, and aligned with, the first housing member 227. When this step is properly completed, the locator studs 287 on the continuous frame 282 project through the apertures 275 in the channel of the second airbag support structure 267. Additionally, the tabs 89 of the continuous frame 282 are captured in the openings formed by the slots 256 of the airbag support structure 245 and the corresponding slots of the airbag support structure 267.

When the inflator 220 is positioned between the housing members 227 and 228, the inflator-supporting fingers 246 and 266 bend to conform to the outer dimensions of the inflator housing 276. (See FIG. 6.) As such, an exact fit is not necessary between the inflator 220 and the inflator support structures 240 and 265. Consequently, inflators of different diameters may be used without structural modification of the housing members 227 and 228. The reaction device 215 is therefore compatible with a variety of commercially-available inflators.

The housing members 227 and 228 are coupled together using any suitable method, such as the methods discussed above in conjunction with the assembly of the airbag assembly 10. For example, conventional fasteners, such as rivets 296, may be inserted through the apertures in the flanges 237 and 269. Suitable fasteners (not shown) may also be drawn down on the locator studs 287 and 288. Additionally or alternatively, a washer 297 and a nut 298 may be drawn down on the threaded stud 279a.

Airbag Assembly 310

The airbag assembly 310 (FIGS. 8-9) includes a reaction device 315, a cylindrical inflator (not visible in the illustrated views) and an airbag (also not visible in the illustrated views). The reaction device 315 includes a first housing member 327 and a second housing member 328. These housing members are configured to capture and orient the cylindrical inflator and the airbag in the cavity 329 of the reaction device 315 as the housing members are being coupled together.

The airbag assembly 310 also includes a cover 331 for the deployment opening 330. The cover 331 includes an elliptical door 331a, a coupling flange 331b, and coupling projections 331c. The door 331a is adapted to separate into segments during deployment of the airbag assembly 310. The coupling flange 331b extends generally perpendicularly from the circumferential edge of the door 331a. The projections 331c are arranged in spaced relation around the inner surface of the coupling flange 331b and project inwardly from this surface. As is explained in more detail below, the coupling flange 331b and the projections 331c are used to attach the cover 331 to the reaction device 315.

The housing members 327 and 328, and thus the reaction device 315, are in many ways similar to the analogous components of the above-described airbag assemblies. However, the geometry of the housing members 327 and 328 differs from those of the airbag assemblies 10, 110 and 210. Particularly, these members are shaped and otherwise designed to create a "venturi" effect within the reaction device 315 during the inflation process. The advantages of such a venturi effect in an airbag assembly are discussed in more detail in U.S. patent application Ser. No. 07/618,643, which is entitled "Aspirated Can With Venturi Channel" and which is assigned to the assignee of the present application.

More particularly, the front of the first housing member 327 has a shape including an arcuate portion 327a, a narrow neck portion 327b, and a semi-conical portion 327c. In the completed airbag assembly 310, the arcuate portion 327a generously surrounds the cylindrical housing of the inflator. Aspiration openings (not visible for the first housing member 327 in the illustrated views) are die-cut or otherwise formed in the arcuate portion 327a. The arcuate portion 327a tapers inwardly towards the neck portion 327b and the semi-conical portion 327c slopes outwardly from the neck portion 327b to the airbag support structure 345.

The second housing member 328 includes corresponding portions, namely an arcuate portion 328a, a narrow neck portion 328b, a semi-conical portion 328c, and aspiration openings 371.

In the completed reaction device 315, the housing members 327 and 328 form a venturi channel within the cavity 329. Specifically, the neck portions 327b and 328b form a throat between the chamber formed by the arcuate portions 327a and 328a and the chamber formed by the semi-conical portions 327c and 328c. During the inflation process, this geometry encourages ambient air to be drawn through the aspiration openings 371 in the second housing member 328 and the analogous openings in the first housing member 327. Valve members, such as flexible foil sheets 372, may be provided to prevent the inflation fluid from escaping through the aspiration openings during the inflation process.

The first and second housing members 327 and 328 are also designed so that the deployment opening 330 has an elliptical geometry. (See FIG. 9.) To this end, the rear edges 336 and 368 of the housing members 327 and 328 are substantially semi-oval in shape. The elliptical shape of the deployment opening 330 increases the structural integrity of the reaction device 315 and minimizes fish-mouthing (outward deformation of the reaction device) during deployment of the airbag assembly 310. Additionally, the elliptical geometry of the opening 330 is believed to facilitate the attachment of the cover 331 to the reaction device 315. Still further, the semi-oval (rather than rectilinear) shape of the rear edges 336 and 368 results in the first and second housing members 327 and 328 being more compatible with automated production techniques.

The flanges 337 and 369 of the housing members 327 and 328 also differ somewhat from the flanges of the housing members of the airbag assemblies 10, 110 and 210. Specifically, flanges 337 and 369 include semi-circular indentions 337a and 369a, respectively. In the completed reaction device 315, these indentations provide an ignitor harness protector channel for certain components of the inflator, namely its squib wires 377.

The housing members 327 and 328 also include certain features to accommodate the cover 331 which are not found in the illustrated airbag assemblies 10, 110 and 210. Specifically, the regions of the housing members between their airbag support structures 345 and 365 and their rear edges 336 and 368 are contoured to accommodate attachment of the cover 331 to the reaction device 315. More specifically, the profile of these regions provides an external channel 315a when the housing members 327 and 328 are coupled together to form the reaction device 315. Apertures 315b are arranged around the channel 315a in a pattern corresponding to the projections 331c of the cover 331.

In the airbag assembly 310, the airbag support structures 345 and 365 are essentially identical to the airbag support structures of the airbag assembly 10 except that the channels are semi-oval, rather than rectilinear, in shape. However, the inflator support structures of the airbag assembly 310 are of a somewhat different construction than the inflator support structures of the airbag assembly 10. Specifically, the inflator support structures of the airbag assembly 310 include semi-cylindrical ledges (not visible in the illustrated views) on which the ends of the inflator may be supported.

The assembly of the airbag assembly 310 is substantially the same as the assembly of the airbag assembly 10. Specifically, the airbag and the inflator are initially placed in predetermined orientations in the first housing member 327. The placement of the inflator includes supporting its ends on the semi-cylindrical ledges of the inflator support structure. Additionally, the inflator squib wires 377 are positioned within the semi-circular indention 337a of the peripheral flange 337.

The second housing member 328 is then placed over, and aligned with, the first housing member 327. Thereafter, the housing members 327 and 328 are coupled together using any suitable method, such as the methods discussed above in conjunction with the assembly of the airbag assembly 10. For example, conventional fasteners, such as rivets 396, may be inserted through apertures in the flanges 337 and 369. In the completed reaction device 315, the inflator squib wires 377 extend through the ignitor harness protector channel formed by the semi-circular indentions 337a and 369a of the flanges 337 and 369.

To complete the airbag assembly 310, the cover 331 is coupled to the reaction device 315. Specifically, the coupling flange 331b is positioned within the external channel 315a of the reaction device 315 and projections 331c are inserted into the apertures 315b. A band 397 is then tensioned around the flange 331b to secure it to the reaction device 315 and provide additional integrity for the airbag assembly 310. The band 397 is preferably dimensioned to fit snugly within the channel 315b. The elliptical geometry of the opening 330 and/or the channel 315a is believed to allow the band 397 to grasp the cover 331 more uniformly.

A modified version of the airbag assembly 310, namely an airbag assembly 310', is shown in FIG. 10. (Analogous parts are designated by like reference numerals, with the parts of the airbag assembly 310' being followed by a single prime (').) In the airbag assembly 310', the airbag is essentially identical to the airbag 225 (rather than the airbag 25) except that the frame 382' is of an elliptical, rather than rectangular, shape. The airbag support structures 345' and 367' are also essentially identical to the airbag support structures 245 and 267 except that the respective channels are of semi-oval, rather than rectilinear, shapes. Consequently, the continuous frame 382' includes locator studs 387' and 388' and the channels of the airbag support structures 345' and 367' include corresponding apertures (shown, but not specifically numbered in the drawing). The cover 331' of the airbag assembly 310' includes an elliptical coupling flange 331b' which is sized to fit within, rather than around, the deployment opening 330'. Additionally, instead of projections 331c, the coupling flange 331b' is provided with openings 331c' arranged to receive the locator studs 387' and 388' of the continuous frame 382'.

In the assembly of the airbag assembly 310', the cover 331' is incorporated into the airbag prior to it being positioned within the first housing member 327". Specifically, the cover coupling flange 331b' is positioned around the continuous frame 382' and the locator studs 387' and 388' are inserted through the openings 331c'. The airbag assembly 310' is then assembled in much the same manner as the airbag assembly 210. In the completed airbag assembly 310', the cover coupling flange 331b' is sandwiched between the continuous frame 382' and the channels of the first and second airbag support structures 345' and 367'.

It may be noted that a cover could be coupled to the airbag assembly 210 in a similar manner.

Airbag Assembly 410

The airbag assembly 410 (FIGS. 11-13) includes a reaction device 415, a cylindrical inflator 420, and an airbag 425. The reaction device 415 includes a first housing member 427 and a second housing member 428. These housing members are configured to capture and orient the cylindrical inflator 420 and the airbag 425 in the cavity of the reaction device 415 as the housing members are being coupled together.

The airbag assembly 410 also includes a cover 431 for the deployment opening 430. The cover 431 includes a rectangular door 431a, a coupling flange 431b, and coupling apertures 431c. The door 431a is adapted to separate into segments during deployment of the airbag assembly 410.

The coupling flange 431b extends generally perpendicularly from the perimetric edge of the door 431a. The apertures 431c are arranged in spaced relation around the top and bottom portions of the flange 431b. As is explained in more detail below, the coupling flange 431b and the apertures 431c are used to attach the cover 431 to the reaction device 415.

The housing members 427 and 428 are preferably molded from a light-weight, high-performance thermoplastic material, such as ULTEM from GE Plastics of Southfield, Mich. The housing members 427 and 428 are in many ways similar to the analogous components of the above-described airbag assemblies. For example, the first housing member 427 includes an inflator support structure 440 and an airbag support structure 445. The inflator support structure 440 includes a pair of generally U-shaped cradles 450 and 451 formed in the base plate 432 of the first housing member 427. The inner contour of the cradle 450 is generally semi-circular except for a flat section 450a which is used for orientation purposes during assembly of the airbag assembly 410. The inner contour of the cradle 451 is essentially semi-circular, i.e., it does not include a flat section. The inflator support structure 440 additionally includes a pair of semi-circular notches 453, one formed in each of the side walls 433 and 434, to accommodate certain components of the inflator 420.

The airbag support structure 445 is essentially the same as the airbag support structure 45 of the airbag assembly 10 except that a series of apertures 459 are formed along its channel.

The second housing member 428, which is a substantially identical, mirror-image of the first housing member 427, includes an inflator support structure 465 and an airbag support structure 467. The inflator support structure 465 includes a pair of U-shaped cradles and the airbag support structure 467 includes a channel in which apertures 473 are formed.

In contrast to the airbag assemblies 10, 110, 210 and 310, the housing members 427 and 428 of the airbag assembly 410 do not include a peripheral flange. Thus, no flanges exist to bolt and/or crimp when coupling the housing members 427 and 428 together. Instead, the first and second housing members 427 and 428 include several coupling components which are not included in the earlier discussed airbag assemblies. These components are designed to couple the housing members 427 and 428 together in a "fastenerless" fashion.

The coupling components of the housing members 427 and 428 include a hook-and-groove arrangement along the upper/lower edges of the front walls of the housing members. Specifically, a first set of hooks 435a and a first set of grooves 435b are located along the upper edge of the front wall 435 of the first housing member 427. A second set of mating hooks and a second set of mating grooves (not visible in the illustrated views) are located along the lower edge of the front wall of the second housing member 428. To couple the housing members 427 and 428 together, the first set of hooks 435a are engaged and locked with the second set of grooves and, simultaneously, the first set of grooves 435b are engaged and locked with the second set of hooks.

The coupling components of the housing members 427 and 428 also include a stud-bore arrangement along the upper/lower edges of the front walls of the housing members. Specifically, a locator stud 435c and a locator bore 435d are situated along the upper edge of the front wall 435 of the first housing member 427. A mating locator bore (not visible in the drawings) and a mating locator stud (also not visible in the drawings) are located along the lower edge of the front wall of the second housing member 428. These components further facilitate aligning and coupling the housing members 427 and 428 together during the assembly process and provide shear load strength for the reaction device 415.

The first and second housing members 427 and 428 also include coupling components for coupling the cover 431 to the reaction device 415. These components specifically include hooks 436a located along the rear edge 436 of the first housing member 427 and hooks 468a located along the rear edge 468 of the second housing member 428.

The inflator 420 comprises a cylindrical housing 476 which encloses a source of inflation fluid (not shown) such as a combustible chemical mixture and/or a quantity of gas. Squib wires 477 project outwardly from one end of the cylindrical housing 476 and are electrically connected to a collision sensor (not shown). A plurality of dispensing nozzles 478 are located on a rear portion of the cylindrical housing 476. The inflator 420 additionally includes orientation components, particularly a radial flange 479a and a locator pin 479b. The radial flange 479a surrounds one end of the housing 476 (the same end from which the squib wires 477 extend) and includes a flat section 479c for orientation purposes. The locator pin 479b extends axially from the other "non-flanged" end of the housing 476.

A cylindrical inflator which may be used in the airbag assembly 410 is disclosed in U.S. Pat. No. 4,938,501 to Wipasuramonton, which is assigned to the assignee of the present invention.

The airbag 425 includes a folded inflatable bag 480 and a retainer in the form of a continuous frame 482. The bag 480 and the frame 482 are generally of the same construction as the analogous components 80 and 82 of the airbag assembly 10. However, in the frame 482, locator studs 487 project upwardly from the top member 485 and locator studs 488 project downwardly from the bottom member 486. The locator studs 487 and 488 are preferably integrally formed with the upper and lower members of the continuous frame 482. Additionally, in contrast to the bag 80 of the airbag assembly 10, the mouth of the bag 480 includes holes (not specifically shown) arranged to receive the locator studs 487 and 488. In the assembly process, the locator studs 487 and 488 cooperate with the apertures 459 and 473 in the airbag support structures 445 and 467. In contrast to the locator studs 287 and 288 discussed above in connection with the airbag assembly 210, the locator studs 487 and 488 are uniformly spaced.

The airbag assembly 410 further includes a pair of resilient silicon insulators 489 and 490. The insulator 489 includes a pair of molded or extruded sections 489a and 489b, each of which includes an inner groove and an outer groove. (The grooves are shown but not specifically numbered in the drawings.) The inner grooves of the insulator sections 489a and 489b are sized to receive bottom and top sections of the inflator radial flange 479a. The outer groove of the insulator section 489a is sized to receive the supporting edge of the cradle 450 of the first inflator support structure 440. The outer groove of the insulator section 489b is sized to receive the supporting edge of the corresponding cradle of the second inflator support structure 465.

The insulator 490 includes a pair of molded or extruded sections 490a and 490b. Each of the insulator sections includes an outer groove sized to receive the supporting edge of the cradle of the adjacent first or second inflator support structure 440 or 465. In contrast to the insulator sections 489a and 489b, the insulator sections 490a and 490b do not include inner grooves. Instead, the inner surfaces of the insulator sections 490a and 490b are relatively smooth for engagement with the inflator housing 476 adjacent its "non-flanged" end.

In the completed airbag assembly 410, the insulators 489 and 490 are resiliently compressed against the inflator housing 476. The compressibility and resilience of the insulators allows for larger tolerances between the inflator housing 476 and the reaction device 415. Consequently, the insulators 489 and 490 provide greater flexibility in manufacturing the inflator 420 for the airbag assembly 410. Additionally, the grooves of the insulator sections 489a and 489b, and their engagement with the inflator-supporting cradles and the inflator flange, tends to restrict both axial and radial movement of the inflator 420. Also, the insulators 489 and 490 thermally insulate the housing members 427 and 428 from the inflator 420. Thus, the insulators 489 and 490 minimize the transmission of vibrations and/or heat between the inflator 420 and the housing members 427 and 428 during the deployment of the airbag assembly 410.

To assemble the airbag assembly 410, the first housing member 427 is initially located in a tabletop holding fixture (not shown). Additionally, the sections of the insulators 489 and 490 are initially pressed onto the respective inflator-supporting cradles of the first and second housing members 427 and 428.

The inflator 420 and the airbag 425 are then placed in predetermined orientations in the first housing member 427. More particularly, the continuous frame 482 of the airbag 425 is appropriately positioned within the channel 455 of the airbag support structure 445. The cylindrical inflator 420 is placed in the inflator-supporting cradles 450 and 451 and pushed into place to fit snugly within the first insulator sections 489a and 490a. When the inflator 420 is properly positioned, the locator pin 479b projects outwardly through the notch 453 in the side wall 433 and the squib wires 477 extend through the notch 453 in the side wall 434. Additionally, the flat section 479c of the inflator flange 479a mates with the flat section 450a of the cradle 450, thereby ensuring that the dispensing nozzles 478 are properly positioned relative to the deployment opening 430 in the completed airbag assembly 410.

Once the inflator 420 and the airbag 425 have been properly positioned within the first housing member 427, the second housing member 428 is placed adjacent to (or, in the illustrated orientation, placed over) the first housing member 427. In the illustrated airbag assembly 410, this positioning includes locking the first set of hooks 435a with the second set of grooves, locking the first set of grooves 435b with the second set of hooks, mating the locator stud 435c with the corresponding locator bore, and mating the locator bore 435d with the corresponding locator stud. In this manner, the housing members 427 and 428 are coupled together to form the reaction device 415.

To complete the airbag assembly 410, the cover 431 is coupled to the reaction device 415. Specifically, the coupling flange 431b is positioned around the deployment opening 430 and the hooks 436a and 468a are inserted through the apertures 431c. A pair of retainer strips 491 are provided for insertion into the distal ends of the hooks 436a and 468a to lock the cover 431 in place. The retainer strips 491 preferably also include apertures to receive the distal ends of the frame locator studs 487 and 488. The retainer strips 491 may then be secured to the first and second housing members 427 and 428 by conventional fastening methods, such as heat staking, sonic welding or attaching pushnuts.

The airbag assembly 410, like all of the airbag assemblies of the present invention, is adapted to be coupled to a vehicle. In the illustrated assembly, this adaptation includes bosses 492 formed in the housing members 427 and 428. Each of the bosses 492 has a bolt hole and a slot. U-clips (not shown) may be pushed onto each boss 492 with one leg passing through the adjacent slot and the other leg overlying the bolt hole. (The legs of each U-clip have holes which align with the bolt hole.) One of these holes is threaded to receive and hold a bolt which extends through the bolt hole and a hole (not shown) in a structural part of the vehicle to mount the assembly on the vehicle.

Additionally or alternatively, an attachment device may be formed on each side of the reaction device 415 to couple the airbag assembly 410 to a structural part of the vehicle. In the illustrated airbag assembly 410, each attachment device includes pocket portions 493 which are formed integrally with the housing members 427 and 428. The pocket portions 493 are designed to accommodate a mounting plate 494 from which threaded pins 494a project. When the mounting plate 494 is located between the pocket portions 493 (i.e. when the housing members 427 and 428 are coupled together), the pins 494a project outwardly through slots in each pocket portion. The pins 494a may be coupled with nuts 495 to a bracket 496 which is then attached to a structural part of the vehicle. The bracket 496 can be formed in any one of a number of configurations so as to be compatible with a particular vehicle. Consequently, by modifying only the bracket 496, the reaction device 415 is compatible with a wide range of vehicles.

Airbag Assembly 510

The airbag assembly 510 (FIGS. 14–15) includes a reaction device 515, a toroidal inflator 520, and an airbag 525. ("Toroidal" in the context of the present application means a structure having a curved outer surface with a radial dimension that is the same or greater than its axial dimension.) The reaction device 515 includes a first housing member 527 and a second housing member 528. These housing members are configured to capture and orient the toroidal inflator 520 and the airbag 525 in the cavity of the reaction device 515 as the housing members are being coupled together.

The first and second housing members 527 and 528 are preferably formed by drawing or stamping aluminum, steel or other appropriate material into the desired shape. The first housing member 527 includes a base plate 532, side walls 533 and 534, and a rear wall 535. The side walls 533 and 534 are preferably formed in one piece with, and extend away from, opposite ends of the base plate 532. The rear wall 535 also extends away from the base plate 532 and interconnects the side walls 533 and 534 adjacent their front ends. The rear ends of the base plate 532 and the side walls 533 and 534 together define a rear edge 536 which partially forms the deployment opening 530 in the completed reaction device 515.

The walls of the first housing member 527 are shaped and arranged to accommodate the toroidal inflator 520. Specifically, the side wall 533 includes a rear portion 533a and a front portion 533b. The rear portion 533a extends generally perpendicular to the deployment opening 530 and the front portion 533b tapers generally inwardly towards the rear wall 535. Additionally, an indentation 533c is formed in an intermediate region of the front portion 533b. The side wall 534 includes a similar rear portion 534a, front portion 534b, and indentation 534c. The length of the tapered front side wall portions 533b and 534b relative the length of the rear side wall portions 533a and 534a, and relative to the length of the rear wall 535, cause the housing member 527 to have a roughly V-shape geometry.

In the illustrated airbag assembly 510, the base plate 532 also includes features to accommodate the toroidal inflator 520. Specifically, a support pedestal 532a is formed in the bottom surface of the base plate 532. Additionally, an aperture 532b is provided in the support pedestal 532a. In the completed reaction device 515, the aperture 532b forms a small passage between the cavity 529 and the exterior of the reaction device 515. As is explained in more detail below, the support pedestal 532a supports certain components of the inflator 520 in the completed airbag assembly 510.

A flange 537 extends at least partially around the periphery of the first housing member 527. More particularly, the flange 537 projects perpendicularly outwardly from the upper edges of the side walls 533 and 534 and the upper edge of the rear wall 535. The outer contour of the flange 537 follows a generally linear profile and is therefore of an increased thickness adjacent to the indentations 533c and 534c. Apertures 538 may be provided in the flange 537 for coupling the housing members 527 and 528 together, for coupling the inflator 520 to the reaction device 515, and/or for coupling the reaction device 515 to a structural part of the vehicle. In the illustrated airbag assembly 510, the apertures 538 are provided adjacent the indentations 533c and 534c and adjacent an intermediate region of the rear wall 535.

The first housing member 527 further includes an inflator support structure 540 and an airbag support structure 545. The inflator support structure 540 comprises a generally polygonal-shaped cradle 551, in which the support pedestal 532a is located. The cradle 551 is formed by the rear wall 535, the indentations 533c and 534c, and the sections of the front portions 533b and 534b of the side walls 533 and 534 extending between the indentations and the rear wall 535. The polygonal-shaped cradle 551 is configured to support the inflator 520 in a predetermined orientation within the reaction device 515.

The airbag support structure 545 is substantially the same as the airbag support structure 45 of the airbag assembly 10. Accordingly, the airbag support structure 545 includes a channel 555 which extends Substantially parallel to the rear edge 536 of the first housing member 527 and which is configured to support the airbag 525 in a predetermined orientation.

The second housing member 528 is essentially identical to the first housing member 527. The second housing member 528 includes an inflator support structure 565, an airbag support structure 567, a rear edge 568 and a flange 569. These components are substantially the same as analogous components in the first housing member 527 and, thus, only certain items are specifically numbered in the drawings. However, the second housing member 528 does not include a support pedestal analogous to the support pedestal 532a of the first housing member 527.

The inflator 520 comprises a toroidal housing 576 which encloses a source of inflation fluid (not shown) such as a combustible chemical mixture. The inflator 520 includes a mounting flange 576a extending radially from the toroidal housing 576. In the illustrated embodiment, the mounting flange 576a is shaped to form a substantially square border around the housing 576. Four apertures 576b are formed on the mounting flange 576a, specifically one in each corner. As is explained in more detail below, the apertures 576b coordinate with the apertures 538 on the first housing member 527 and the analogous apertures on the second housing member 528 during assembly of the airbag assembly 510. The use of inflators with mounting flanges having other shades (such as triangular) and/or alternate aperture arrangements (such as on only two of the four corners of a square) are possible with, and contemplated by, the present invention.

The mounting flange 576a may be viewed as separating the housing 576 into a dispensing portion 576c and a base portion 576d. In the illustrated embodiment, the dimensions of the dispensing portion 576c are greater in the axial direction than the base portion 576d. Squib wires 577 project outwardly from one end of the toroidal housing 576, specifically, the end of the base portion 576d. The squib wires 577 are electrically connected to a collision sensor (not shown). A plurality of dispensing nozzles 578 are arranged, in a 360° pattern, around the curved circumference of the dispensing portion 576c. At the onset of a collision, an ignitor device (including the squib wires 577) ignites the chemical mixture and a large quantity of an inert, non-toxic gaseous inflation fluid, such as nitrogen, is released through the nozzles 578. The inflator 520 may be constructed in the manner described in U.S. Pat. No. 4,902,036.

The airbag 525 is essentially the same as the airbag 25 of the airbag assembly 10. Accordingly, the airbag 525 includes a folded inflatable bag 580 which is formed from fabric such as nylon and which includes a mouth 581 defining an inflation fluid inlet. The airbag 525 also includes a retainer in the form of a continuous frame 582. The continuous frame 582 is generally rectangular in shape and is preferably formed in one piece from a relatively rigid material, such as aluminum, steel or a polymeric material. The continuous frame 582 is attached to the bag 580 adjacent its mouth 581 by a suitable attachment technique, for example, stitching or adhesives.

In the assembly of the airbag assembly 510, the airbag 525 is initially placed in a predetermined orientation in the first housing member 527. More particularly, the continuous frame 582 is positioned within the channel 555 of the airbag support structure 545. In the illustrated assembly, the first portion of the frame 582 will be located in the channel 555 and the second portion of the frame 582 will project upwardly from the first housing member 527.

The inflator 520 is next placed in a predetermined orientation in the first housing member 527. In this predetermined orientation, the base portion 576d will be positioned within the cradle 551 of the inflator support structure 540. Some alignment of the inflator 520 is necessary during this positioning. Specifically, the inflator 520 must be oriented so that the apertures 576b on the mounting flange 576a are aligned with the apertures 538 on the first housing member 527. In the predetermined orientation, the square mounting flange 576a will be arranged diagonally relative to the deployment opening 530. It may be noted that certain features of the inflator 520 (i.e., the 360° pattern of the dispensing nozzles 578, the square shape of the mounting flange 576a, and the fact that the apertures 576b are provided on all four corners of the mounting flange 576a) allow the inflator to be "correctly" aligned in four different orientations. During the placement of the inflator 520 in the cradle 551, the base portion 576d is positioned on the support pedestal 732a and the squib wires 577 are threaded through the aperture 532b.

Once the inflator 520 and the airbag 525 have been placed in the first housing member 527, the second housing member 528 is placed over the first housing member. The second housing member 528 is aligned with the first housing member 527 in such a manner that the inflator 520 and the airbag 525 are supported in predetermined orientations within the cavity 529. In particular, the inflator 520 is supported between the cradles of the first and second inflator support structures 540 and 565, while the airbag 525 is supported between the channels of the first and second airbag support structures 545 and 567. When the first and second housing members 527 and 528 are aligned in this manner, the flanges 537 and 569 are located in adjacent, side-by-side relation, and their apertures are aligned with each other. Although not specifically shown in the drawings, appropriate recesses would be provided in the flanges 537 and 569 to accommodate the inflator flange 576a.

The first and second housing members 527 and 528 are then coupled together. Specifically, three conventional fasteners (not shown) are inserted through the aligned apertures in the second housing flange (apertures not specifically shown or numbered), the first housing flange (apertures 538) and the mounting flange 576a (apertures 576b). Thus, the fasteners, in addition to coupling the housing members together, couple the inflator 520 to the reaction device 515. For additional reinforcement, the flanges 537 and 569 may be crimped together.

Figure 16:
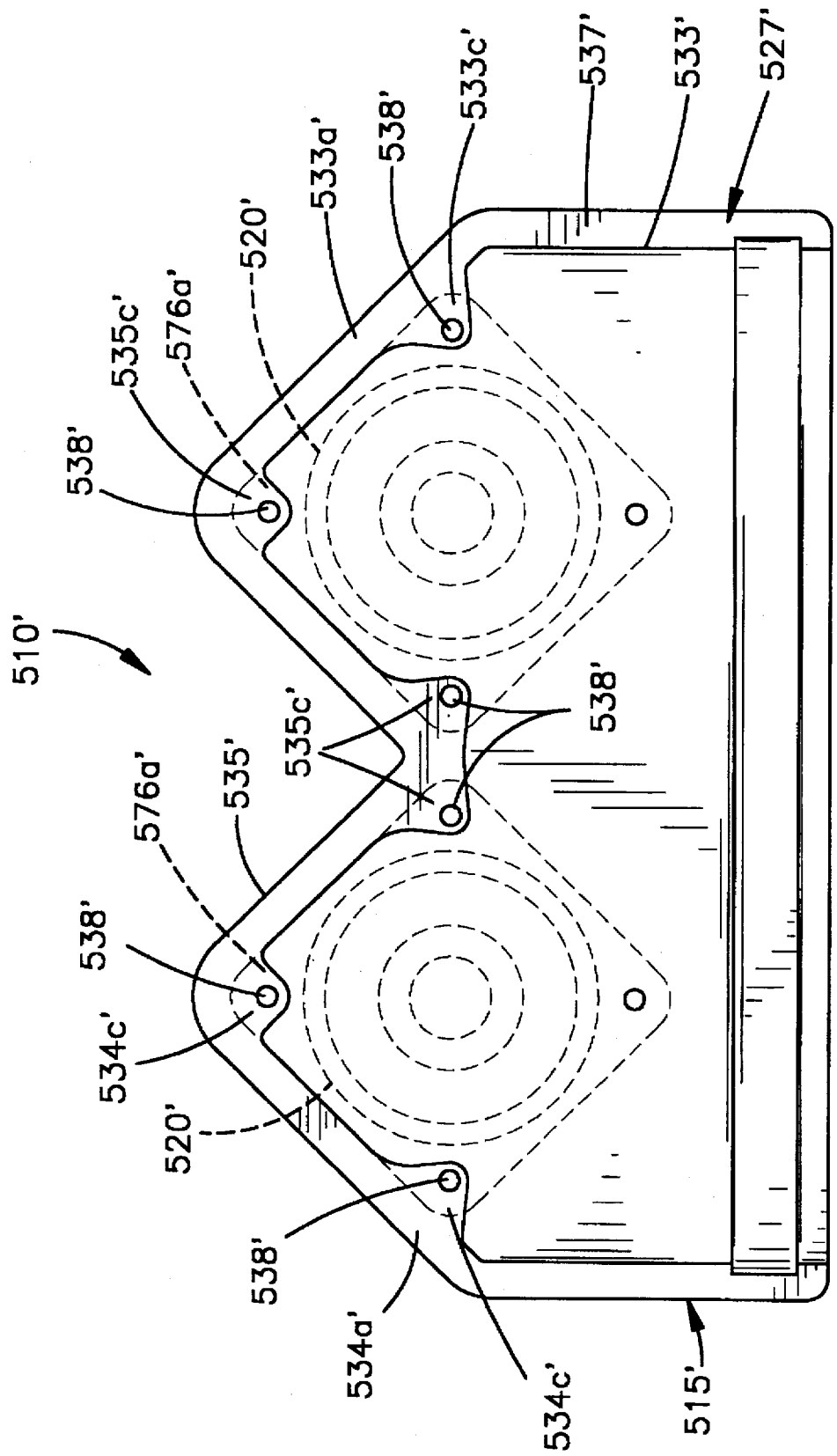
FIG. 16 is a top plan view of a modified version of the airbag assembly 510, namely an airbag assembly 510'.

A modified version of the airbag assembly 510, namely an airbag assembly 510', is shown in FIG. 16. (Like parts are designated by like reference numerals, with the parts of the airbag assembly 510' being followed by a single prime (').) In the airbag assembly 510', the first and second housing members are modified to support two toroidal inflators 520' in a predetermined orientation in the reaction device 515'. Thus, in the airbag assembly 510', the housing members are configured to capture and orient a pair of inflators 520' and the airbag in the cavity of the reaction device 515' as the housing members are being coupled together.

The airbag assembly 510' is essentially identical to the airbag assembly 510 except that the housing members are modified to create generally double a pair of polygonal cradles for the inflators 520'. Specifically, the first housing member 527' is modified so that the rear side wall portions 533a' and 534a' and the rear wall 535' form a "W" shape outline. Additionally, indentations 533c' and 534c' are provided at the outer ends and outer vertexes of the "W" and a pair of indentations 535c' are provided at the center vertex of the "W". Apertures 538' are located in the flange 537' adjacent each of the indentations. The shape of the second housing member is modified in a similar manner.

Figure 17:
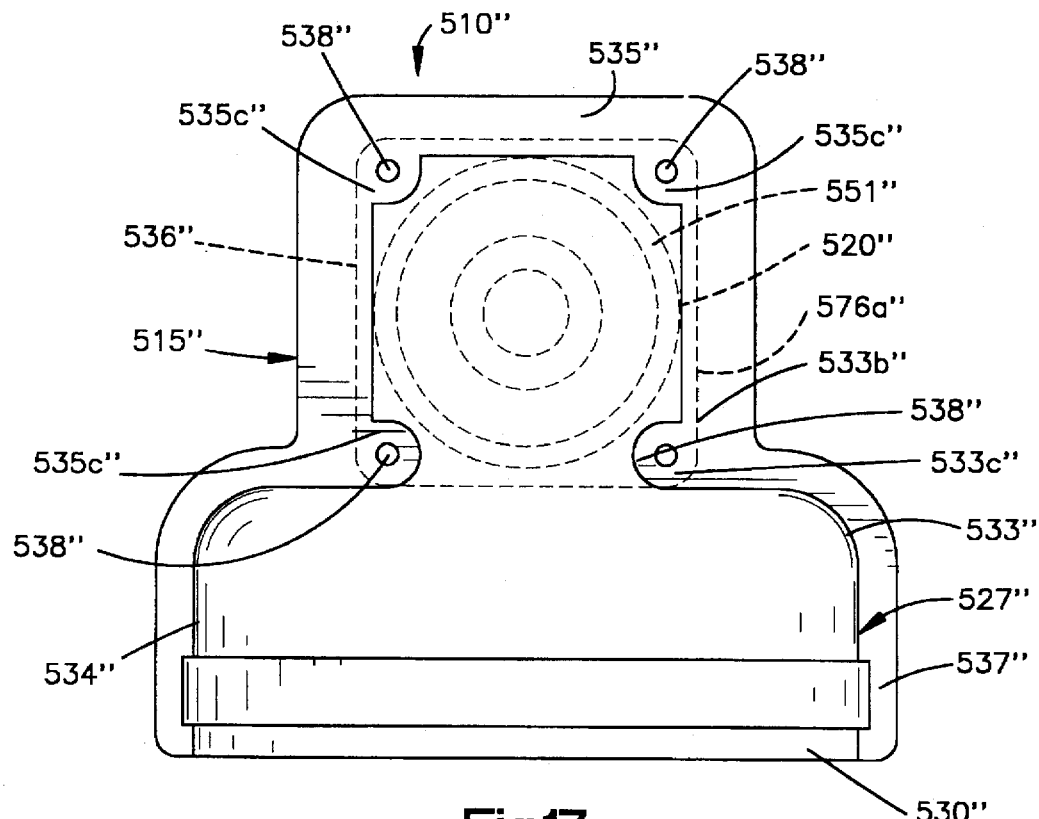
FIG. 17 is a top plan view of another modified version of the airbag assembly 510, namely an airbag assembly 510"

Another modified version of the airbag assembly 510, namely an airbag assembly 510", is shown in FIG. 17. (Like parts are designated by like reference numerals, with the parts of the airbag assembly 510" being followed by a double prime (").) In the airbag assembly 510", the first and second housing members are designed to support a toroidal inflator 520" in a different predetermined orientation in the reaction device 515". In this different predetermined orientation, the rear side of the square mounting flange 576a" is arranged parallel (as opposed to diagonally) to the deployment opening 530".

The airbag assembly 510" is essentially identical to the airbag assembly 510 except that the housing members are modified to create a generally square-shaped cradle for the inflator 520". Specifically, the first housing member 527" is modified so that the rear side wall portions 533a" and 534a" and the rear wall 535" form a "square" outline. Additionally, indentations 533c" and 534c" are provided at the rear corners of the square, and indentations 535c" are provided at the front corners of the square. Apertures 538" are located in the flange 537" adjacent each of the indentations. The shape of the second housing member is modified in a similar manner. In the completed airbag assembly 510", fasteners would be inserted through all four apertures in the inflator mounting flange 576a".

Figure 18:
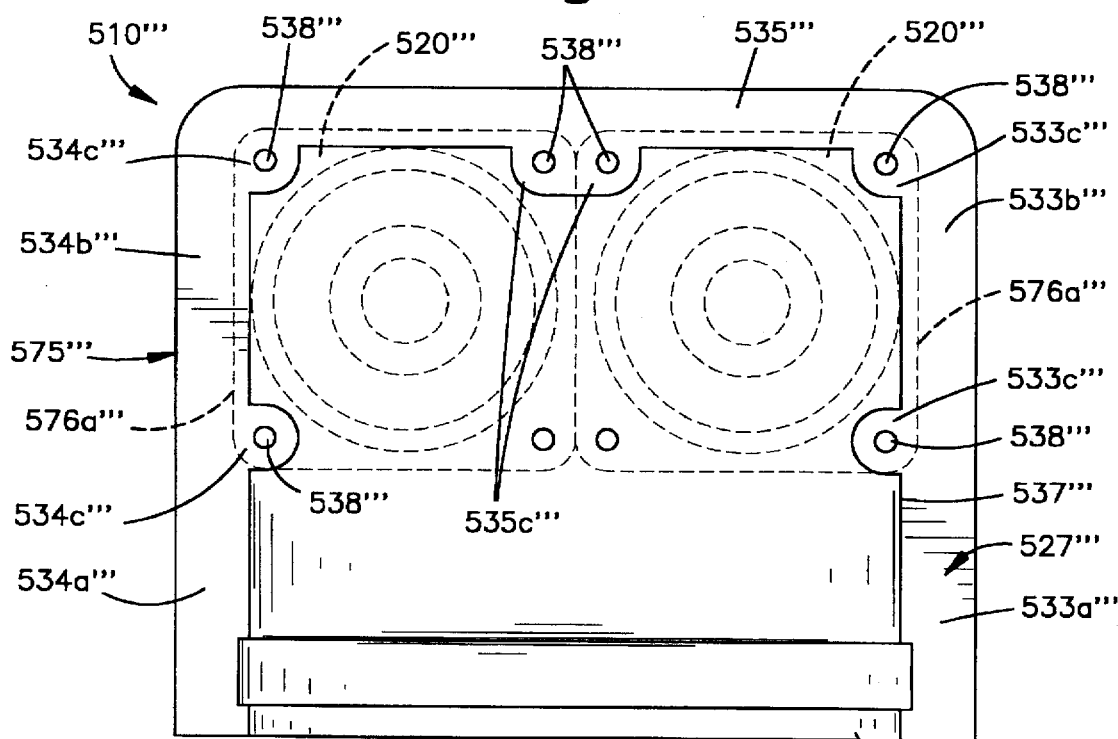
FIG. 18 is a top plan view of yet another modified version of the airbag assembly 510, namely an airbag assembly 510'"
Figure 19:
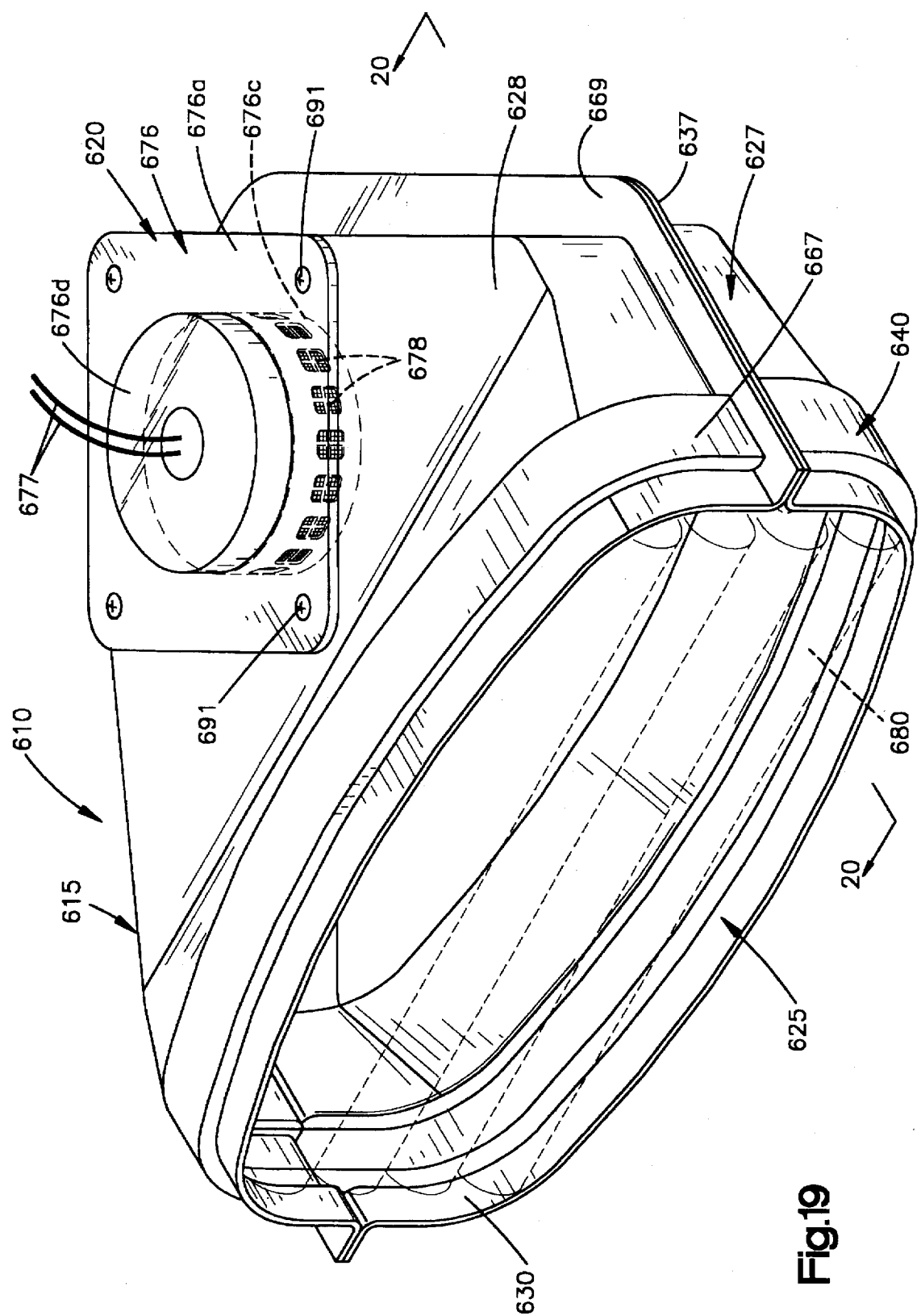
FIG. 19 is a perspective view of an airbag assembly 610 according to the present invention.
Figure 20:
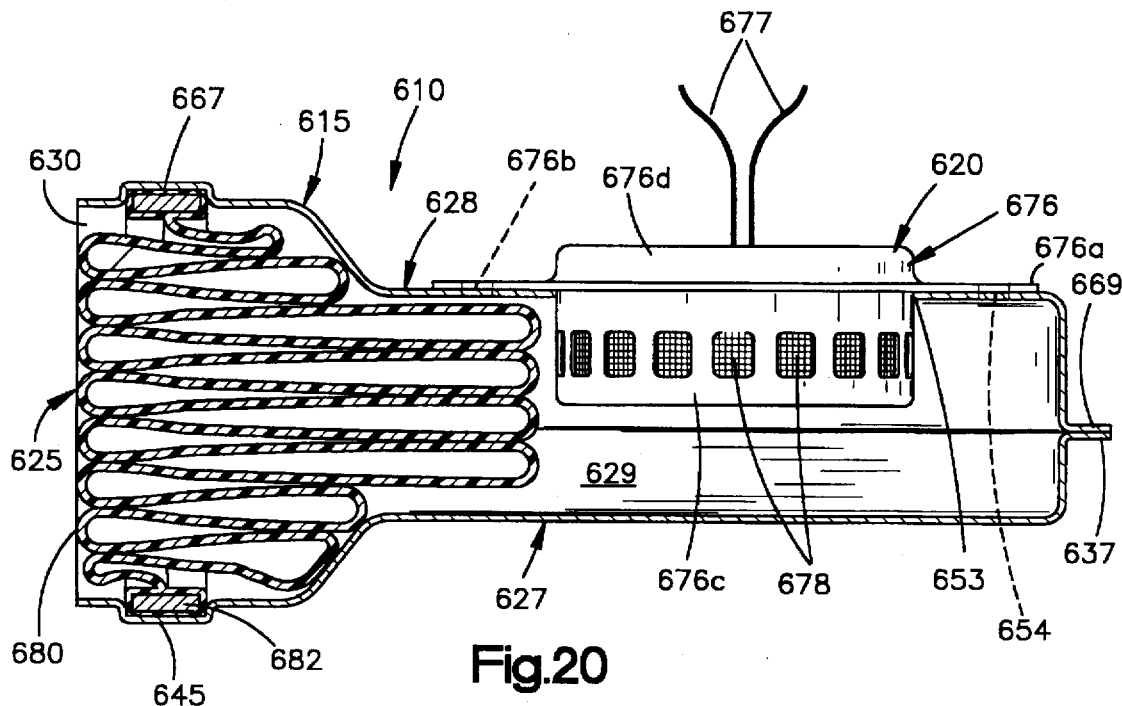
FIG. 20 is a sectional view of the airbag assembly 610, taken substantially along the plane described by the line 20—20 of FIG. 19.

Yet another modified version of the airbag assembly 510, namely an airbag assembly 510''', is shown in FIG. 18. (Like parts are designated by like reference numerals, with the parts of the airbag assembly 510''' being followed by a triple prime (''').) In the airbag assembly 510''', the first and second housing members are modified to support a pair of inflators 520''' in a predetermined orientation in the reaction device 515'''. In this predetermined orientation, the rear sides of the inflator mounting flanges 576a''' are arranged parallel (as opposed to diagonally) to the deployment opening 530'''. Thus, in the airbag assembly 510''', the housing members are configured to capture and orient a pair of inflators 520''' and the airbag in the cavity of the reaction device 515''' as the housing members are being coupled together.

The airbag assembly 510''' is essentially identical to the airbag assembly 510 except that the housing members are modified to create generally rectangular-shaped cradles for the inflators 520'''.

Specifically, the first housing member 527''' is modified so that the rear side wall portions 533a''' and 534a''' and the rear wall 535''' form a "rectangular" outline. In this airbag assembly 510''', the rear side wall portions 533a''' and 534a''' are essentially colinear with the front side wall portions 533b''' and 534b'''. Additionally, indentations 533c''' and 534c''' are provided at the front and rear corners of the rectangle, and a pair of indentations 535c''' are provided at an intermediate portion of the rear wall 535'''. Apertures 538''' are located in the flange 537''' adjacent each of the indentations. The shape of the second housing member is modified in a similar manner. In the completed airbag assembly 510''', fasteners would be inserted in three of the four apertures in each of the inflator mounting flanges 576a'''.

Airbag Assembly 610

The airbag assembly 610 (FIGS. 19–20) includes a reaction device 615, a toroidal inflator 620, and an airbag 625. The reaction device 615 includes a first housing member 627 and a second housing member 628. These housing members are configured to capture and orient the airbag 625 in the cavity of the reaction device 615 as the housing members are being coupled together.

The first and second housing members 627 and 628 are similar in many ways to the first and second housing members 527 and 528 of the airbag assembly 510. For example, the first and second housing members 627 and 628 include airbag support structures 645 and 667 which are essentially identical to the airbag support structures of the airbag assembly 510. However, the housing members 627 and 628 do not include inflator supporting structures analogous to those of the airbag assembly 510. Instead, one of the housing members (the second housing member 628 in the illustrated assembly 610) includes an inflator-supporting opening 653. Two or more, and preferably four, apertures 654 are arranged in a square pattern around the inflator-supporting opening 653. As is explained in more detail below, the inflator-supporting opening 653 and the apertures 654 are sized and arranged to accommodate an "external" mounting of the inflator 620.

The absence of the inflator supporting structures (or cradles) in the housing members 627 and 628 results in the front portions of these members having a slightly different profile than the housing members of the airbag assembly 510. For example, no indentations (such as the indentations 533c and 534c found in the airbag assembly 510) are necessary along the side walls of the members. Additionally, the first housing member 627 does not include a "squib wire" channel (such as the channel 532a of the airbag assembly 510).

The inflator 620 is essentially identical to the inflator 520 of the airbag assembly 510. Thus, the inflator 620 comprises a toroidal housing 676, a square mounting flange 676a with an aperture 676b on each of its four corners, a dispensing portion 676c, and a base portion 676d. Squib wires 677 project outwardly from the base portion 676d and a plurality of dispensing nozzles 678 are arranged, in a 360° pattern, around the radial side of the dispensing portion 676c. Again, the use of inflators with mounting flanges having other shapes (such as triangular) and/or alternate aperture arrangements (such as on only two of the four corners of a square) are possible with, and contemplated by, the present invention.

The airbag 625 is essentially the same as the airbag 25 of the airbag assembly 10. Accordingly, the airbag 625 includes a folded inflatable bag 680 and a retainer in the form of a continuous frame 682.

In the assembly of the airbag assembly 610, the airbag 625 is initially placed in a predetermined orientation in the first housing member 627. More particularly, the continuous frame 682 is positioned within the channel of the airbag support structure 645. The second housing member 628 is then placed over the first housing member 627 and aligned so that the airbag 625 is supported in a predetermined orientation within the cavity 629. In particular, the airbag 625 is supported between the channels of the first and second airbag support structures 645 and 667. When the first and second housing members 627 and 628 are aligned in this manner, their flanges 637 and 669 are located in adjacent, side-by-side relation.

The first and second housing members 627 and 628 are then be coupled together to complete the reaction device 615. In the illustrated airbag assembly 610, this coupling could be accomplished by crimping the flanges 637 and 669 together. Additionally or alternatively, apertures could be provided in the flanges 637 and 669 for suitable fasteners (not shown).

The inflator 620 is next placed in a predetermined orientation relative to the reaction device 615. In the predetermined orientation of the illustrated airbag assembly 610, the square mounting flange 676a is arranged diagonally relative to the deployment opening 630. The placement of the inflator 620 particularly includes inserting the dispensing portion 676c of the inflator 620 through the inflator-supporting opening 653. As was indicated above, the inflator-supporting opening 653 and the apertures 654 of the second housing member 628 are sized and arranged to accommodate an external mounting of the inflator 620. To this end, the inflator supporting opening 653 is sized so that it is large enough to receive the inflator dispensing portion 676c but small enough to prevent insertion of the inflator mounting flange 676a. Additionally, the apertures 654 are arranged for alignment with the apertures 676b on the inflator mounting flange 676a.

When properly inserted, the mounting flange 676a rests on the outer surface of the second housing member 628 and the base portion 676d will project upwardly from the flange 676a. Some alignment of the inflator 620 is necessary. Specifically, the inflator 620 must be oriented so that the apertures 676b on the inflator mounting flange 676a are aligned with the apertures 654 on the second housing member 627. (As with the inflator 520, the inflator 620 may be "correctly" aligned relative to the reaction device 615 in four different orientations.) Once the inflator 620 is correctly positioned and aligned, appropriate fasteners 691 are used to couple the inflator to the second housing member 627. It may be noted that, in the completed airbag assembly 610, the space in the reaction device 615 below the dispensing portion 676c of the inflator 620 remains essentially vacant.

Alternatively, the inflator 620 may be coupled to the second housing member 628 prior to the positioning and/or coupling of the housing members together.

Figure 21:
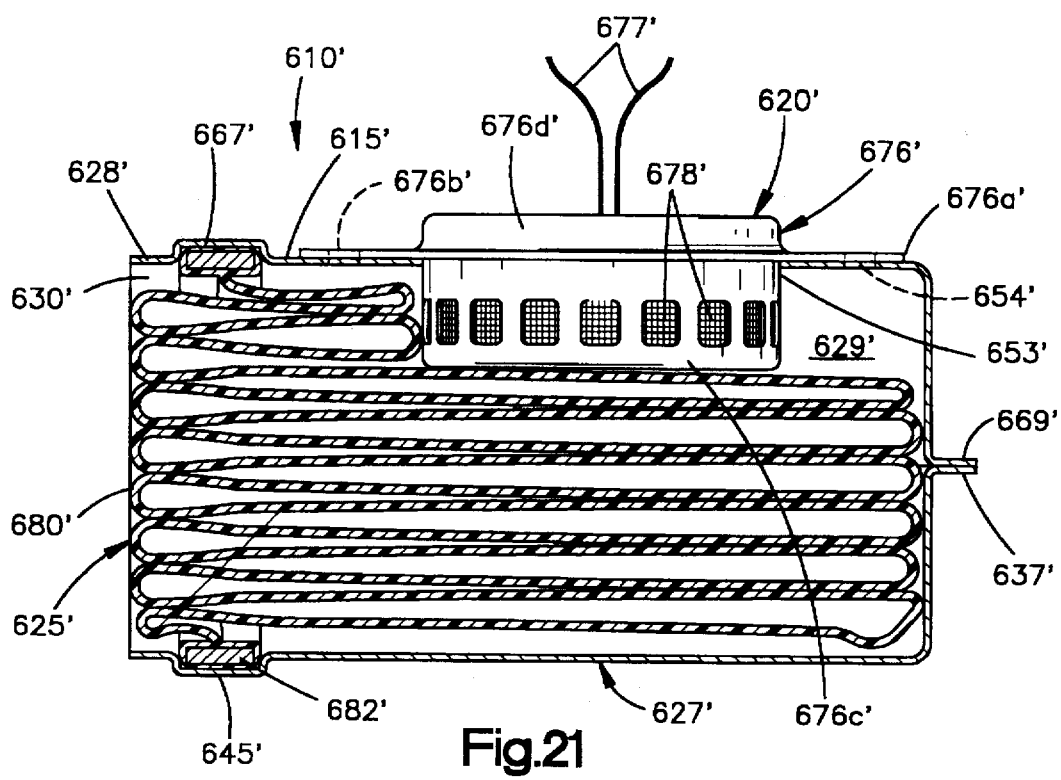
FIG. 21 is a sectional view of a modified version of the airbag assembly 610, namely an airbag assembly 610'.

A modified version of the airbag assembly 610, namely an airbag assembly 610', is shown in FIG. 21. (Like parts are designated by like reference numerals, with the parts of the airbag assembly 610' being followed by a single prime (').) The airbag assembly 610' is essentially identical to the airbag assembly 610 except for the shape of the first and second housing members 627' and 628'. Specifically the housing members 627' and 628' are modified so that the height (i.e., the distance between parallel portions of the housing members) of the rear region of the cavity 629' is essentially the same as the height of the front region of the cavity. Additionally, in the completed airbag assembly 610', the bag 680' is folded so that it occupies the space below the dispensing portion 676c' of the inflator 620'.

Figure 22:
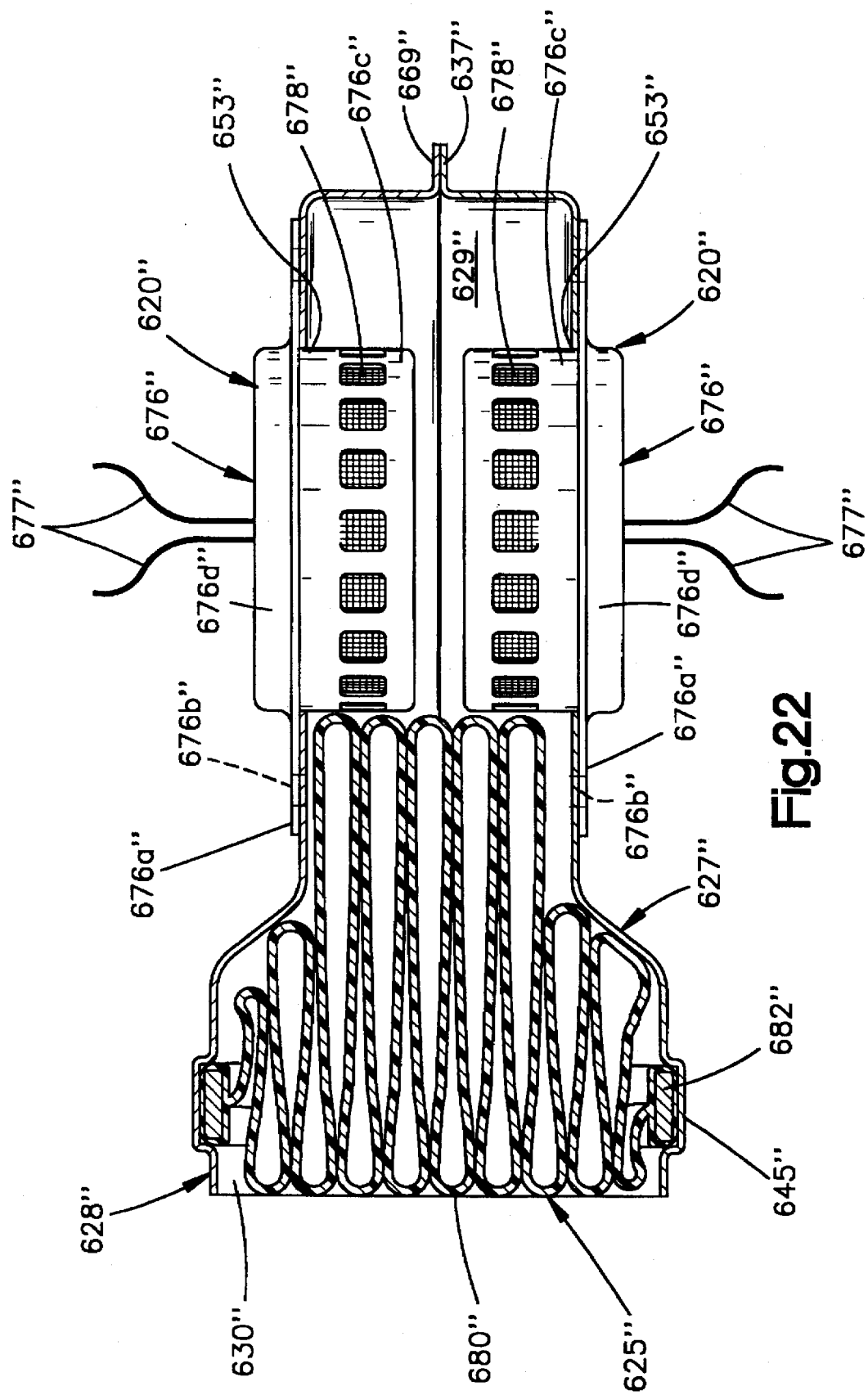
FIG. 22 is a sectional view of another modified version of the airbag assembly 610, namely an airbag assembly 610"
Figure 23:
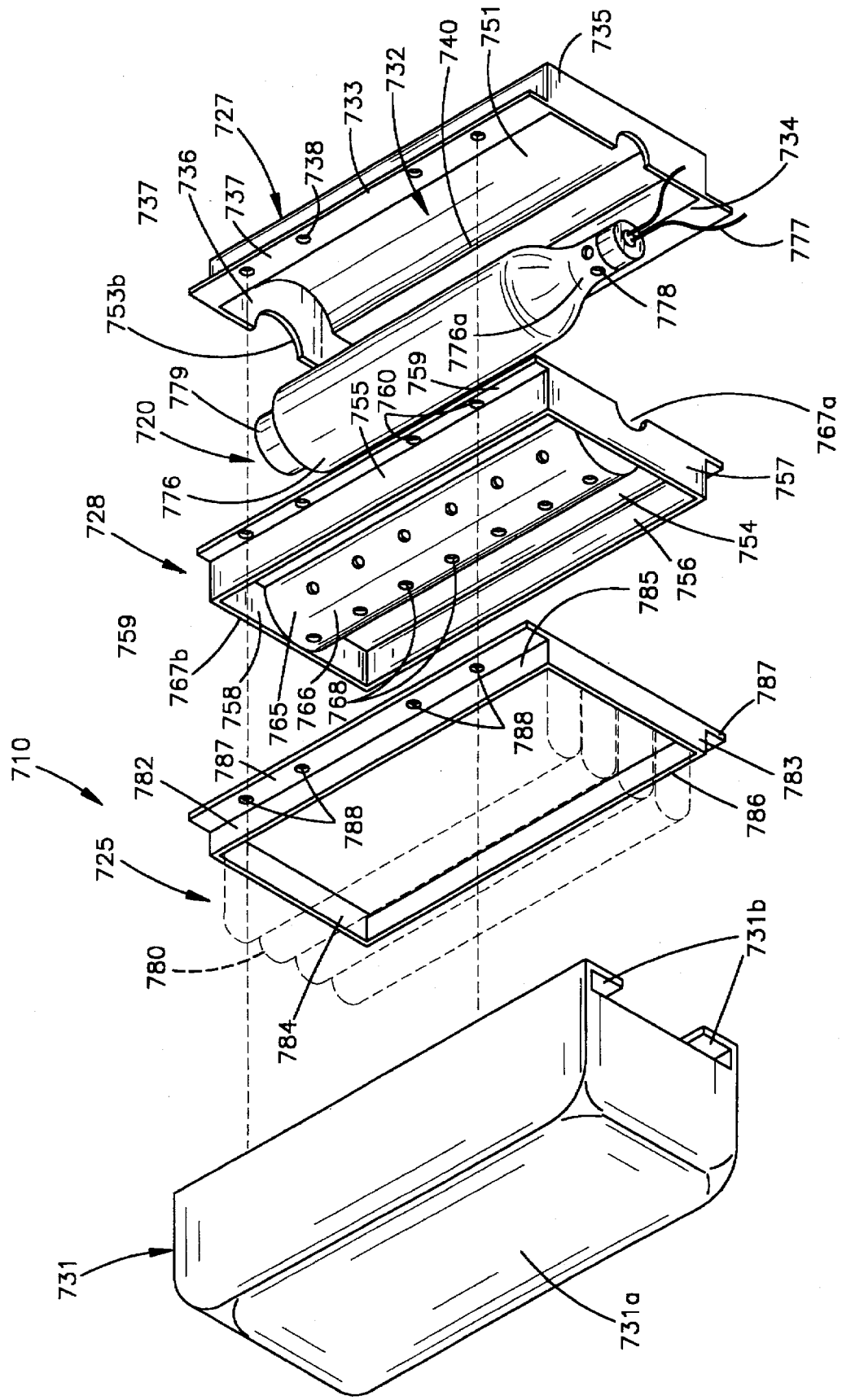
FIG. 23 is an exploded pre-assembly perspective view of an airbag assembly 710 according to the present invention.

Another modified version of the airbag assembly 610, namely an airbag assembly 610", is shown in FIG. 22. (Like parts are designated by like reference numerals, with the parts of the airbag assembly 610" being followed by a double prime (").) The airbag assembly 610" is essentially identical to the airbag assembly 610 except that the first housing member 627" is also provided with an inflator-supporting opening 653" and another inflator 620" is also externally mounted to the reaction device 615."

Airbag Assembly 710

The airbag assembly 710 (FIG. 23) includes a reaction device, a cylindrical inflator 720, and an airbag 725. The reaction device includes a first housing member 727 and a second housing member 728. These housing members are configured to capture and orient the cylindrical inflator 720 in the cavity of the reaction device as the housing members are being coupled together.

The airbag assembly 710 also includes a cover 731 for the deployment opening. In the illustrated assembly 710, the cover 731 includes a receptacle 731a which is adapted to separate into segments during deployment of the airbag assembly 710. In the completed airbag assembly 710, the receptacle forms a container for the airbag 725. Two L-shaped (in cross-section) coupling tabs 731b are provided on the top and bottom of the receptacle 731a. Each tab extends frontward from the receptacle 731a and then turns inward. The inwardly extending portion of each coupling tab 731b is provided with a pair of apertures. (Apertures are not visible in the illustrated view.) As is explained in more detail below, the coupling flanges 731b are used to attach the cover 731 to the reaction device.

The first and second housing members 727 and 728 are preferably formed by drawing or stamping aluminum, steel or other appropriate material into the desired shape. The first housing member 727 is a generally box-like structure having a base plate 732, parallel top and bottom walls 733 and 734, and parallel side walls 735 and 736. The walls 733-736 extend rearwardly from, and form a perpendicular border around, the base plate 732. A pair of coupling tabs 737 project perpendicularly outward from the distal edge of each of the top and bottom walls 733 and 734. Each tab 737 includes apertures 738.

The first housing member 727 includes an inflator support structure 740 formed in its base plate 732 and its side walls 735 and 736. Specifically, the inflator support structure 740 includes a cradle 751, or a concave semi-cylindrical compression, formed in the base plate 732. The cradle 751 is sized to generously surround a front portion of the inflator 720. Additionally, the inflator support structure 740 includes a semi-circular notch 753a formed in the side wall 735 and a larger semi-circular notch 753b formed in the side wall 736. As is explained in more detail below, the notches 753a and 753b are sized and arranged to accommodate certain portions of the inflator 720.

The second housing member 728 is a generally box-like structure having a base plate 754, parallel top and bottom walls 755 and 756, and parallel side walls 757 and 758. The walls 755-758 extend rearwardly from, and form a perpendicular border around, the base plate 754. A pair of coupling tabs 759 project perpendicularly outwardly from the proximate edge of each of the top and bottom walls 755 and 756. Each tab 759 includes apertures 760.

The second housing member 728 includes an inflator support structure 765 formed in its base plate 754 and its side walls 757 and 758. Specifically, the inflator support structure 765 includes a cradle 766, or a convex semi-cylindrical compression, formed in the base plate 754. The cradle 766 is sized to generously surround a rear portion of the inflator 720. Additionally, the inflator support structure 765 includes a semi-circular notch 767a formed in the side wall 757 and a larger semi-circular notch 767b formed in the side wall 758. As is explained in more detail below, the second housing member 728 also functions as a diffuser in the completed airbag assembly 710. To this end, the cradle 766 (or the convex semi-cylindrical compression) includes a plurality of openings or slots 768.

Thus, in contrast to the airbag assemblies discussed above, the first and second housing members 727 and 728 of the airbag assembly 710 are not essentially identical.

The inflator 720 is substantially the same as the inflator 120 of the airbag assembly 110. Accordingly, the inflator 720 comprises a cylindrical housing 776 which is bottle-shaped and includes a neck 776a. Squib wires 777 project outwardly from the distal end of the neck 776a and a plurality of dispensing nozzles 778 are located around the entire periphery of the neck 776a. At the onset of a collision, an activation assembly (which includes the squib wires 777) releases the pressurized inflation fluid so that it flows through the nozzles 778 in a 360° pattern. In the inflator 720, a disk-shaped projection 779 projects outwardly from the "non-necked" end of the housing 776.

The inflator 720, like the inflator 120, can be used with a diffuser to direct the inflation fluid uniformly into the airbag 725. As was discussed above, in the illustrated airbag assembly 710, a diffuser is incorporated into the second housing member 728 or, more particularly, its base plate 754. During deployment of the completed airbag assembly 710, inflation fluid will flow from the bottle 776, into the annular mixing chamber formed by the cradles 751 and 766, through the openings 768 in the base plate 754, and into the airbag 725.

The airbag 725 includes a folded inflatable bag 780 which is formed from a fabric such as nylon and which includes a mouth defining an inflation fluid inlet. The airbag 725 also includes a continuous frame 782 attached to the bag 780. The frame 782 is generally rectangular in shape and includes parallel side members 783 and 784, and parallel top and bottom members 785 and 786. The continuous frame 782 is of a somewhat different construction than the continuous frames of the airbag assemblies discussed above. Particularly, the front surfaces of the frame members 783–786 are co-planar so that they form a flat surface. Additionally, a pair of coupling tabs 787 project perpendicularly outwardly from the front edge of each of the top and bottom members 785 and 786. Each tab 787 includes apertures 788.

In the assembly of the airbag assembly 710, the inflator 720 is initially placed in a predetermined orientation in the first housing member 727. The placement of the inflator 720 particularly includes positioning the bottle neck 776a in the notch 753a in the side wall 735 and positioning the projection 779 in the notch 753b in the side wall 736. As with the inflator 120, the inflator 720 does not have to be radially aligned within the reaction device. In other words, because the nozzles 778 are arranged in a 360° pattern, the inflator 720 may be located in any rotational orientation within the inflator support structure 740.

Once the inflator 720 has been positioned in the first housing member 727, the second housing member 728 is placed adjacent to the first housing member 727. The second housing member 728 is aligned with the first housing member 727 in such a manner that the inflator 720 is supported in a predetermined orientation within the cavity of the reaction device. In this predetermined orientation, the distal end of the bottle neck 776a is tightly secured within the circular opening formed by the semi-circular notches 753a and 767a, the projection 779 is tightly secured within the circular opening formed by the semi-circular notches 753b and 767b, and the remaining portions of the inflator 720 (including the dispensing nozzles 778) are generously surrounded by and spaced from the cradles 751 and 766. Additionally, when the first and second housing members 727 and 728 are properly aligned, the corresponding coupling tabs 737 and 759 are located in adjacent, side-by-side relation, and the corresponding apertures 738 and 760 are aligned with each other.

The first and second housing members 727 and 728 may then be coupled together using any suitable method to form the reaction device. As with the airbag assembly 110, the first and second housing members 727 and 728 must be sealed to one another and to the inflator 720 to prevent the escape of inflation fluid.

Thereafter, the airbag 725 and the cover 731 may be coupled to the reaction device. However, in the illustrated airbag assembly 710, the airbag 725 and the cover 731 are coupled to the housing members 727 and 728 at the same time the housing members are being coupled to each other. Specifically, the inflatable bag 780 and the continuous frame 782 are inserted into the receptacle 731a of the cover 731. Additionally, the L-shaped coupling tabs 731b are positioned around the frame coupling tabs 787 in such a manner that the corresponding apertures are aligned.

The airbag frame 782 (with the cover 731 coupled thereto) is then positioned around the perpendicular border of the second housing member 728 (i.e., the border formed by the walls 755–758 around the base plate 754). When properly positioned the corresponding coupling tabs (i.e., the tabs 787 of the frame 782, the tabs 731b of the cover 731, the tabs 759 of the second housing member 728, and the tabs 737 of the first housing member 727) are located in adjacent, side-by-side relation, and the corresponding apertures on these tabs are aligned with each other.

Conventional fasteners (not shown) may then be inserted through the aligned apertures to couple the housing members 727 and 728 together to form the reaction device and to couple the airbag 725 and the cover 731 to the reaction device.

Alternative Inflator Support Structures

While applicants have disclosed several preferred structures and techniques for capturing and supporting an inflator as a reaction device is being formed, it is believed that other structures and techniques may be used without departing from the broader concepts of the invention. For example, a cradle for the inflator can be formed by a separate member which is coupled to one or more of the housing members and which supports an inflator in spaced relation to the housing members as the reaction device and the inflator are assembled. The cradle can be formed, e.g., as a frame with a portion having a V-shaped configuration, or as a piece of spring steel or spring wire configured to form a V-shaped cradle. When the cradle is formed as a frame with a portion having a V-shaped configuration, the frame can be secured to one of the housing members, e.g. by means of a locking screw (which can be a set screw that allows some range of adjustment of the position of the frame relative to the housing members). When the cradle is formed by a piece of spring steel or spring wire, a portion of the spring steel or spring wire can be secured directly to one of the housing members.

Moreover, a spring structure can be integrally incorporated into the reaction device in such a way that the inflator is resiliently held in the cradle as the reaction device is being formed. The spring structure can act between the cradle and one of the housing members, or it can act between the inflator and one of the housing members. For example, when the cradle is formed as a frame with a portion having a V-shaped configuration, the spring structure can comprise a coil spring which surrounds the shaft of the locking screw which secures the frame to one of the housing members. The spring structure can also comprise a separate spring member (e.g. a spring clip formed of spring wire), which is secured to one of the housing members and which acts between the housing member and the inflator to hold the inflator in the cradle formed in the frame. When the cradle is formed by a piece of spring steel or spring wire, the piece of spring steel or the piece of spring wire also forms the spring structure.

A cradle and spring structure which hold an inflator in spaced relation to the housing members, and resiliently hold the inflator in the cradle would allow for some expansion of the inflator housing as gases are being directed from the inflator. Such a feature would be useful in connection with inflators in which gases are generated at elevated temperatures.

Alternative Airbag Support Structures

Although the airbag support structures of the above-identified airbag assemblies included channels, "channelless" airbag support structures are possible with, and contemplated by, the present invention. For example, in the airbag assembly 210, the airbag support structures 245 and 267 of the housing members 227 and 228 could constitute flat surfaces with appropriately spaced apertures to receive the locator studs 287 and 288 of the airbag frame 282. In the assembly of the airbag assembly 210, the airbag 225 would be initially placed in a predetermined orientation in the first housing member 227 and this placement would include inserting the locator studs 288 through the apertures of the first airbag support structure 245. Thereafter, the second housing member 228 would be placed over, and aligned with, the first housing member 227 so that the locator studs 287 projected through the apertures of the second airbag support structure 267. In this manner, the housing members would be configured to capture and orient the airbag 225 in the cavity of the reaction device 215 as the housing members are being coupled together.

Alternatively, "channel-less" versions of the airbag support structures 245 and 267 could constitute flat surfaces with appropriately spaced apertures to receive rivets. In this version, the continuous frame 282 would include apertures (instead of locator studs) positioned to align with the apertures in the airbag support structures. Preferably, the airbag support structures would also include at least one locating aperture and the continuous frame 282 would also include at least one locator stud. In the assembly of the airbag assembly 210, the airbag 225 would be initially placed in a predetermined orientation in the first housing member 227 and this placement would include inserting the locator stud through the locating aperture of the first airbag support structure 245. This insertion would ensure that the corresponding rivet apertures are appropriately aligned. Thereafter, the second housing member 228 would be placed over, and aligned with, the first housing member 227 so that the remaining corresponding rivet apertures are appropriately aligned. Thereafter rivets (or other suitable fasteners) would be used to secure the airbag 225 to the housing members. In this manner, the housing members would be configured to capture and orient the airbag 225 in the cavity of the reaction device 215 as the housing members are being coupled together.

Closing

One may now appreciate that the present invention provides an airbag assembly formed by a plurality of housing members adapted to be coupled together. The housing members are configured to capture and orient an inflator and/or an airbag in the cavity of the reaction device as the housing members are being coupled together. In this manner, the inflator and/or the airbag are coupled with the reaction device as the reaction device is being formed.

Although the invention has been shown and described with respect to certain preferred embodiments, it is obvious that equivalent alterations and modifications will occur to others skilled in the art upon the reading and understanding of this specification. For example, any of the features included in one illustrated airbag assembly could be incorporated, where appropriate, into another illustrated airbag assembly. The present invention includes all such equivalent alterations and modifications and is limited only by the scope of the following claims.

What is claimed is:

1. A vehicle safety apparatus comprising:
    an inflatable air bag for, when inflated, restraining a vehicle occupant;
    at least one actuatable inflator for, when actuated, releasing inflation fluid through openings in said inflator to inflate said air bag, said inflator including a container containing a source of inflation fluid;
    first and second housing members coupled together to form a reaction can, said first and second housing members defining a cavity containing said air bag and a deployment opening through which said air bag is deployed upon inflation of said air bag;
    means supporting said inflator with said inflator openings in communication with said cavity; and
    said first and second housing members including means for capturing said air bag in said cavity and retaining said air bag in a predetermined orientation in said cavity as said first and second housing members are coupled together to form said reaction can.

2. A vehicle safety apparatus according to claim 1 further comprising means for capturing said inflator in said cavity and retaining said inflator in a predetermined orientation in said cavity as said first and second housing members are coupled together to form said reaction can.

3. A vehicle safety apparatus according to claim 1 wherein said at least one inflator includes a cylindrical inflator.

4. A vehicle safety apparatus according to claim 1 wherein said deployment opening has an elliptical shape.

5. A vehicle safety apparatus according to claim 1 wherein said first and second housing members include means for defining a venturi channel extending between said inflator and said air bag when said first and second housing members are coupled together.

6. A vehicle safety apparatus according to claim 1 further comprising a cover and a band which can be tensioned around said cover, said first and second housing members including means for tensioning said band around said cover to couple said cover to said reaction can.

7. A vehicle safety apparatus according to claim 1 wherein at least one of said first and second housing members includes a diffuser for dispersing inflation fluid flow from said inflator.

8. A vehicle safety apparatus according to claim 1 wherein said first and second housing members are essentially identical.

9. A vehicle safety apparatus according to claim 1 wherein each of said first and second housing members comprises a single piece of metal material.

10. A vehicle safety apparatus according to claim 1 wherein each of said first and second housing members comprises a single piece of polymeric material.

11. A vehicle safety apparatus according to claim 1 wherein at least one of said first and second housing members includes means for defining a number of aspiration openings.

12. A vehicle safety apparatus according to claim 1 further comprising a diffuser for dispersing inflation fluid flow from said inflator, said first and second housing members including means for capturing said diffuser and retaining said diffuser in a predetermined orientation in said cavity as said first and second housing members are being coupled together to form said reaction can.

13. A vehicle safety apparatus comprising:
    an inflatable air bag for, when inflated, restraining a vehicle occupant;
    at least one actuatable inflator for, when actuated, releasing inflation fluid to inflate said air bag, said inflator including a container containing a source of inflation fluid;
    first and second housing members coupled together to form a reaction can having a cavity and a deployment opening through which said air bag is deployed upon inflation of said air bag, said first and second housing members including means for capturing one of said inflator and said air bag in said cavity and retaining the one of said inflator and said air bag in a predetermined orientation in said cavity as said first and second housing members are coupled together to form said reaction can; and each of said first and second housing members having a generally U-shaped structure in a portion thereof and cooperating with the generally U-shaped structure of the other one of said first and second housing members to define said deployment opening in said reaction can as said first and second housing members are coupled together to form said reaction can.

14. A vehicle safety apparatus according to claim 13 further comprising means for capturing the other one of said inflator and said air bag in said cavity and retaining the other one of said inflator and said air bag in a predetermined orientation in said cavity as said first and second housing members are coupled together to form said reaction can.

15. A vehicle safety apparatus according to claim 13 wherein said at least one inflator includes a cylindrical inflator.

16. A vehicle safety apparatus according to claim 13 wherein said deployment opening has an elliptical shape.

17. A vehicle safety apparatus according to claim 13 wherein said first and second housing members include means for defining a venturi channel extending between said inflator and said air bag when said first and second housing members are coupled together.

18. A vehicle safety apparatus according to claim 13 further comprising a cover and a band which can be tensioned around said cover, said first and second housing members including means for tensioning said band around said cover to couple said cover to said reaction can.

19. A vehicle safety apparatus according to claim 13 wherein at least one of said first and second housing members includes a diffuser for dispersing inflation fluid flow from said inflator.

20. A vehicle safety apparatus according to claim 13 wherein said first and second housing members are essentially identical.

21. A vehicle safety apparatus according to claim 13 wherein each of said first and second housing members comprises a single piece of metal material.

22. A vehicle safety apparatus according to claim 13 wherein each of said first and second housing members comprises a single piece of polymeric material.

23. A vehicle safety apparatus according to claim 13 wherein at least one of said first and second housing members includes means for defining a number of aspiration openings.

24. A vehicle safety apparatus according to claim 13 further comprising a diffuser for dispersing inflation fluid flow from said inflator, said first and second housing members including means for capturing said diffuser and retaining said diffuser in a predetermined orientation in said cavity as said first and second housing members are coupled together to form said reaction can.

25. A method of assembling an air bag assembly, said method comprising the steps of:

coupling a first housing member and a second housing member together to form a reaction can having a cavity and a deployment opening through which an air bag may be deployed;

capturing at least one of an air bag and an inflator in the cavity of the reaction can and retaining the at least one of the air bag and the inflator in a predetermined orientation in the cavity as the first and second housing members are coupled together to form the reaction can; and moving a generally U-shaped structure of one of the first and second housing members into engagement with a generally U-shaped structure of the other one of the first and second members to form the deployment opening in the reaction can as the at least one of the air bag and the inflator is being captured and retained in the predetermined orientation in the cavity.

26. A method according to claim 25 further comprising the step of placing the air bag in a predetermined orientation in the first housing member.

27. A method according to claim 26 wherein the step of coupling includes the steps of (i) positioning the second housing member adjacent to the first housing member after the air bag has been placed in the first housing member, and (ii) aligning the first and second housing members to capture and retain the air bag in a predetermined position within the cavity in the reaction can as the first and second housing members are coupled together.

28. A method according to claim 25 further comprising the step of placing the inflator in a predetermined orientation in the first housing member.

29. A method according to claim 28 wherein the step of coupling includes the steps of (i) positioning the second housing member adjacent to the first housing member after the inflator has been placed in the first housing member, and (ii) aligning the first and second members to capture and retain the inflator within the cavity in the reaction can as the first and second housing members are coupled together.

30. A vehicle safety apparatus comprising:

a housing including a first portion and a second portion which define a first chamber in said housing, at least one of said first and second portions having a series of fastener openings;

an inflator disposed in said first chamber between said first and second portions of said housing, said inflator including a wall defining a second chamber in said inflator, an inflation fluid source disposed in said second chamber in said inflator, said inflator wall having an outer surface extending in a given direction between first and second opposite end portions of said inflator;

an inflatable vehicle occupant restraint attached to said housing and having an inflation fluid opening;

said first and second portions of said housing clamping against said outer surface of said inflator, said first and second portions of said housing defining said first chamber which (i) extends between said clamped end portions of said inflator and (ii) receives inflation fluid from said inflator, said first and second portions of said housing cooperating to direct inflation fluid from said first chamber into the inflation fluid opening in said occupant restraint; and a plurality of fasteners extending through said fastener openings in said at least one portion of said housing, said fasteners connecting said first portion of said housing with said second portion of said housing.

31. A vehicle safety apparatus according to claim 30 wherein (i) said first and second opposite end portions of said inflator are opposite cylindrical end wall portions of said inflator and (ii) said outer surface of said inflator is a cylindrical outer surface which has a longitudinal central axis extending in said given direction between said first and second opposite cylindrical end wall portions of said inflator, said first and second portions of said housing clamping against said cylindrical outer surface of said inflator in a direction perpendicular to said longitudinal central axis extending in said given direction.

32. An airbag assembly including a reaction device, an inflator coupled to said reaction device, and an airbag also coupled to said reaction device;

said reaction device comprising a plurality of housing members adapted to be coupled together to form said reaction device;

said reaction device defining a cavity and a deployment opening;

said plurality of housing members being configured to capture at least one of said inflator and said airbag in said cavity and to retain said at least one of said inflator and said airbag in a predetermined orientation in said cavity as said housing members are coupled together;

said plurality of housing members consisting essentially of a first housing member and a second housing member;

said first and second housing members each including an inflator support structure formed in one piece with the respective housing member;

each of said inflator support structures including a cradle, each cradle having a configuration which matches the configuration of at least a portion of said inflator, each cradle cooperating to capture and support said inflator in said predetermined orientation;

said inflator being a cylindrical inflator comprising a cylindrical housing enclosing a source of inflation fluid, squib wires projecting outwardly from one end of said cylindrical housing, and a plurality of dispensing nozzles; and a resilient biasing device located so as to resiliently hold the inflator in said cradle as said housing members are coupled together;

said resilient biasing device comprising a spring formed in one piece with one of said housing members, said spring being located so as to engage the exterior of the inflator and to resiliently press the inflator against the other of said housing members as said housing members are coupled together.

* * * * *